(12) United States Patent
Nagasawa et al.

(10) Patent No.: US 10,309,338 B2
(45) Date of Patent: Jun. 4, 2019

(54) FUEL INJECTION CONTROL DEVICE FOR DIRECT-INJECTION ENGINE

(71) Applicant: MAZDA MOTOR CORPORATION, Hiroshima (JP)

(72) Inventors: Takeshi Nagasawa, Hiroshima (JP); Noriyuki Ota, Hiroshima (JP); Kenji Uchida, Hiroshima (JP); Ryohei Ono, Hiroshima (JP); Kiyotaka Sato, Yokohama (JP); Hidefumi Fujimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/558,847

(22) PCT Filed: Mar. 16, 2016

(86) PCT No.: PCT/JP2016/001512
§ 371 (c)(1),
(2) Date: Sep. 15, 2017

(87) PCT Pub. No.: WO2016/152101
PCT Pub. Date: Sep. 29, 2016

(65) Prior Publication Data
US 2018/0058366 A1 Mar. 1, 2018

(30) Foreign Application Priority Data
Mar. 23, 2015 (JP) ................................. 2015-059857

(51) Int. Cl.
*F02D 41/40* (2006.01)
*F02B 17/00* (2006.01)
(Continued)

(52) U.S. Cl.
CPC .......... *F02D 41/402* (2013.01); *F02B 17/005* (2013.01); *F02D 41/2096* (2013.01);
(Continued)

(58) Field of Classification Search
CPC .... F02B 17/005; F02D 40/402; F02D 40/403; F02D 40/405; F02D 40/2096;
(Continued)

(56) References Cited

U.S. PATENT DOCUMENTS 5,582,152 A * 12/1996 Drutel ................. F02D 41/1498
123/436
5,975,428 A * 11/1999 Potschin ............... F02M 47/027
239/585.1

(Continued)

FOREIGN PATENT DOCUMENTS

DE      10064790 A1 *  6/2001  ......... F02D 41/2096
DE      10225209 A1 *  1/2003  ............. F02M 45/12

(Continued)

OTHER PUBLICATIONS

International Search Report issued in PCT/JP2016/001512; dated Jun. 14, 2016.

*Primary Examiner* — John M Zaleskas
(74) *Attorney, Agent, or Firm* — Studebaker & Brackett PC

(57) ABSTRACT

A fuel injection valve (6) is configured such that the effective opening area of an injection port (61) increases as its lift amount increases. A fuel injection control unit (an engine control unit 100) injects fuel in a lift amount changing mode wherein, when fuel is injected into a combustion chamber (17) in the terminal period of the compression stroke, the lift amount of the fuel injection valve is set to a predetermined large lift amount in the earlier period of the injection period, and in the later period of the injection period following the (Continued)

earlier period of the injection period, the lift amount is set to a small lift amount smaller than the large lift amount and is in a range where the fuel injection speed increases.

1 Claim, 12 Drawing Sheets

(51) Int. Cl.
*F02D 41/38* (2006.01)
*F02D 41/20* (2006.01)
*F02D 41/30* (2006.01)
*F02M 51/06* (2006.01)

(52) U.S. Cl.
CPC ......... *F02D 41/3041* (2013.01); *F02D 41/38* (2013.01); *F02D 41/401* (2013.01); *F02D 2041/389* (2013.01); *F02D 2200/101* (2013.01); *F02M 51/0603* (2013.01); *Y02T 10/44* (2013.01)

(58) Field of Classification Search
CPC ........ F02D 2041/389; F02D 2200/101; F02M 45/04; F02M 51/0603; F02M 63/0026
USPC ......................................................... 123/299
See application file for complete search history.

(56) References Cited

U.S. PATENT DOCUMENTS

| | | | | |
|---|---|---|---|---|
| 5,983,853 A * | 11/1999 | Roessler | .............. | F02B 17/005 123/295 |
| 6,067,954 A * | 5/2000 | Kudou | .................... | F02D 41/10 123/295 |
| 6,302,080 B1 * | 10/2001 | Kato | .................. | F02D 41/3827 123/295 |
| 6,422,211 B1 * | 7/2002 | Boecking | ............... | F02M 45/08 123/300 |
| 6,467,453 B1 * | 10/2002 | Ernst | .................... | F02D 41/402 123/299 |
| 6,478,013 B1 * | 11/2002 | Boecking | ............ | F02D 41/2096 123/467 |
| 7,150,410 B1 * | 12/2006 | Straub | .................... | F02D 41/20 239/5 |
| 2002/0000218 A1 * | 1/2002 | Rueger | ............... | F02D 41/2096 123/498 |
| 2002/0194837 A1 * | 12/2002 | Fluga | ................... | F01N 3/2006 60/284 |
| 2002/0195081 A1 * | 12/2002 | McGee | ................. | F02D 41/045 123/299 |
| 2004/0194756 A1 * | 10/2004 | Hotta | .................. | F02D 41/3836 123/299 |
| 2005/0173565 A1 | 8/2005 | Cooke et al. | | |
| 2005/0205052 A1 * | 9/2005 | Blessing | ............... | F02D 41/403 123/299 |
| 2005/0224041 A1 * | 10/2005 | Herrmann | ............ | F02B 23/101 123/295 |
| 2005/0279321 A1 * | 12/2005 | Crawford | ........... | F02B 23/0657 123/260 |
| 2006/0042586 A1 * | 3/2006 | Hutmacher | ......... | F02B 23/0651 123/276 |
| 2006/0144367 A1 * | 7/2006 | Futonagane | ........ | F02D 41/3836 123/446 |
| 2008/0041344 A1 * | 2/2008 | Wing | ................. | F02M 51/0603 123/472 |
| 2008/0047529 A1 * | 2/2008 | Cooke | ................ | F02D 41/2096 123/478 |
| 2008/0053408 A1 * | 3/2008 | Futonagane | ........ | F02D 41/2096 123/456 |
| 2008/0099585 A1 | 5/2008 | Ohata et al. | | |
| 2008/0135014 A1 * | 6/2008 | Blessing | ............... | F02D 41/405 123/299 |
| 2009/0013962 A1 * | 1/2009 | Ashizawa | ............. | F02B 23/101 123/306 |
| 2009/0063016 A1 * | 3/2009 | Nakata | ................ | F02D 41/2096 701/103 |
| 2009/0271092 A1 * | 10/2009 | Ashizawa | ............. | F02B 23/101 701/103 |
| 2011/0155105 A1 * | 6/2011 | Sukegawa | ............... | F02D 41/20 123/478 |
| 2011/0180039 A1 * | 7/2011 | Nada | ....................... | F02D 35/02 123/445 |
| 2012/0016571 A1 * | 1/2012 | Nada | .................... | F02D 41/3035 701/104 |
| 2012/0143479 A1 * | 6/2012 | Nada | .................... | F02D 41/3029 701/104 |
| 2013/0192562 A1 * | 8/2013 | Matsumura | ............ | F02M 69/04 123/445 |
| 2015/0260136 A1 * | 9/2015 | Melis | .................. | F02D 41/3011 123/490 |
| 2016/0201594 A1 * | 7/2016 | Matsubara | ............. | F02D 41/38 123/299 |
| 2016/0252041 A1 * | 9/2016 | Harada | ................. | F02D 41/402 123/299 |
| 2017/0058793 A1 * | 3/2017 | Harada | ............. | F02M 61/1806 |
| 2018/0080401 A1 * | 3/2018 | Nagasawa | ............... | F02D 41/06 |

FOREIGN PATENT DOCUMENTS

| | | | | |
|---|---|---|---|---|
| DE | 10326914 A1 * | 1/2005 | ........ | F02D 41/2096 |
| JP | S59-58127 A | 4/1984 | | |
| JP | H11-270428 A | 10/1999 | | |
| JP | 2004-044494 A | 2/2004 | | |
| JP | 2005-201272 A | 7/2005 | | |
| JP | 2006274841 A * | 10/2006 | ........ | F02D 41/2096 |
| JP | 2006307703 A * | 11/2006 | .......... | F02D 41/064 |
| JP | 2008-151043 A | 7/2008 | | |
| JP | 2009-243355 A | 10/2009 | | |
| JP | 2011-132849 A | 7/2011 | | |
| JP | 2013-057266 A | 3/2013 | | |
| JP | 2013057266 A * | 3/2013 | | |

* cited by examiner

FUEL INJECTION CONTROL DEVICE FOR DIRECT-INJECTION ENGINE

TECHNICAL FIELD

The technique disclosed herein relates to a fuel injection control device for a direct-injection engine.

BACKGROUND ART

Patent Document 1 teaches an outwardly-opening fuel injection valve injecting fuel in the form of a hollow cone into a combustion chamber of an engine. In the outwardly-opening fuel injection valve, an effective opening area of a nozzle port, through which the fuel is injected, varies according to the change in a lift amount of a valve body. Patent Document 2 teaches a valve covered orifice (VCO) nozzle type fuel injection valve. The VCO nozzle type fuel injection valve is configured such that a needle valve is seated directly on a seat portion where a nozzle port is open to close the nozzle port. The size of a cavity area generated on the inner peripheral surface of the nozzle port varies according to a lift amount of the needle valve. In the VCO nozzle type fuel injection valve, as well as an outwardly-opening injector, the effective opening area of the nozzle port varies according to the lift amount of the needle valve.

Patent Document 3 teaches a direct-injection engine provided with an outwardly-opening fuel injection valve disposed on the central axis of a cylinder and injecting fuel in the form of a hollow cone, wherein the fuel is injected into the cylinder in the second half of a compression stroke, thereby forming, in the combustion chamber, an air-fuel mixture layer and a gas layer around the air-fuel mixture layer. The engine disclosed in Patent Document 3 reduces cooling loss by allowing the gas layer around the air-fuel mixture layer to serve as a heat-insulating layer at the combustion of the air-fuel mixture.

Patent Document 4 teaches a compression self-ignition engine in which a wall surface defining the combustion chamber is made of a heat-insulating material to reduce cooling loss in the wall surface of the combustion chamber.

CITATION LIST

Patent Document

Patent Document 1: Japanese Unexamined Patent Publication No. 2008-151043
Patent Document 2: Japanese Patent No. 4194564
Patent Document 3: Japanese Unexamined Patent Publication No. 2013-57266
Patent Document 4: Japanese Unexamined Patent Publication No. 2009-243355

SUMMARY OF THE INVENTION

Technical Problem

As taught in Patent Document 3, when a heat-insulating gas layer is going to be formed around the air-fuel mixture layer, it is advantageous to inject fuel into the combustion chamber in the second half of the compression stroke. Note that the second half of the compression stroke means the latter half of a compression stroke period divided into two equal periods. Fuel is injected in the second half of the compression stroke, whereby the fuel is injected into the cylinder having a high pressure. As a result, this reduces the risk of the fuel spray reaching the wall surface of the combustion chamber due to too long fuel spray. In addition, the time since the end of injection to the start of combustion is short, which makes it hard for the air-fuel mixture layer formed in the combustion chamber to be mixed with the heat-insulating gas layer. Thus, the heat-insulating gas layer can be secured at the time of combustion.

However, an increase in speed of an engine decreases the time taken to change a crank angle. This decreases the time after the end of fuel injection until ignition. This may deteriorate the ability to vaporize the fuel injected and the ability to mix fuel with air. For example, this may generate smoke.

To address these problems, the start of fuel injection may be advanced when the engine is operated at a rotational speed which falls within a high speed range. However, if the fuel injection start timing is advanced, the fuel is injected in a situation where the pressure and temperature in the cylinder are low. Therefore, this allows the fuel spray to be easily dispersed, thereby allowing the air-fuel mixture to easily reach the wall surface of the combustion chamber. As a result, no heat-insulating gas layer is formed, and cooling loss is not reduced.

In view of these problems, the technique disclosed herein attempts to, in a direct-injection engine, reliably form an air-fuel mixture layer and a heat-insulating gas layer in a combustion chamber while reducing generation of smoke.

Solution to the Problem

For example, in a fuel injection valve, like an outwardly-opening fuel injection valve, configured to increase an effective opening area of the injection port through which fuel is injected as a lift amount increases, an increase in the effective opening area of the injection port under a condition where a fuel pressure is constant decreases the injection speed of the fuel. In addition, too narrow effective opening area of the injection port causes friction between the wall surface of the injection port and the fuel to exert increased influence when the fuel passes through the injection port. This case also decreases the injection speed of the fuel. Thus, there exists a lift amount associated with the fastest injection speed of the fuel. If a lift amount is larger or smaller than the lift amount associated with the fastest injection speed, the injection speed of the fuel is decreased in either case. This lift amount associated with the fastest injection speed is relatively small.

If an increase in the lift amount of the fuel injection valve increases the effective opening area of the fuel injection valve at the start of fuel injection, a resistance applied on the fuel, i.e., a proportion of the friction resistance of the wall surface to the flow rate of the fuel is decreased. Thus, the injection speed of the fuel is quickly increased after the start of fuel spray.

If the lift amount of the fuel injection valve is increased at the start of fuel injection to quickly increase the injection speed of the fuel, and then, the lift amount of the fuel injection valve is decreased while the fuel injection is continued (the lift amount is decreased with the lift amount associated with the fastest injection speed as the lower limit), the flow of the fuel is such that the injection speed of the fuel is further increased without a decrease in the flow rate of the injection due to the inertial dynamic effect. In this way, the fuel spray is injected at a high speed into the cylinder where the pressure and the temperature are high, whereby the fuel spray is blown in the combustion chamber while receiving a large resistance. As a result, atomization of the fuel is facilitated. The atomized fuel is vaporized within a short period of time, and allowed to be sufficiently mixed with air. This is advantageous in reducing generation of smoke.

The present inventors have developed the technique disclosed herein by discovering that adopting such a fuel injection manner allows a reduction in time after the end of the fuel injection until ignition, and thus, the start of fuel injection does not have to be advanced even if, e.g., the engine is operated at a rotational speed which falls within the high rotational speed range.

Specifically, the technique disclosed herein is a fuel injection control device for a direct-injection engine. This device includes: an engine body having a combustion chamber defined by a ceiling portion of a cylinder head, a cylinder provided to a cylinder block, and a piston reciprocating in the cylinder; and a fuel injection controller having a fuel injection valve disposed so as to inject liquid fuel into the combustion chamber, and configured to inject the fuel into the combustion chamber at a predetermined timing.

The fuel injection valve is configured such that an effective opening area of an injection port through which the fuel is injected increases as a lift amount of the fuel injection valve increases. The fuel injection controller injects the fuel in a lift amount changing mode in which, when the fuel is injected into the combustion chamber in a terminal period of a compression stroke, the lift amount of the fuel injection valve is set to a predetermined large lift amount in an earlier period of an injection period, and in a later period of the injection period following the earlier period of the injection period, the lift amount is set to a small lift amount smaller than the large lift amount and is in a range where a fuel injection speed increases.

The "terminal period of the compression stroke" is defined as the terminal period of a compression stroke period divided into three periods, namely, initial, interim, and terminal periods. Also, the combustion chamber described herein is not limited to the inner space of the cylinder when the piston reaches its top dead center, but is a combustion chamber in the broad sense of the term, which is the space defined by the ceiling portion of the cylinder head, the cylinder, and the piston irrespective of the location of the piston. Furthermore, "the earlier period of the injection period" means a relatively earlier part of the injection period, and is not limited to the former half of the injection period divided into two equal periods. Likewise, "the later period of the injection period" means a relatively later part of the injection period, and is not limited to the latter half of the injection period divided into two equal periods.

According this configuration, the fuel injection controller, when injecting the fuel in the terminal period of the compression stroke, sets the lift amount of the fuel injection valve to the predetermined large lift amount in the earlier period of the fuel injection period. As described above, a proportion of the friction resistance of the wall surface to the flow rate of the fuel is decreased. Thus, the injection speed of the fuel increases quickly after the start of fuel injection.

After the sufficient increase in the injection speed of the fuel, the fuel injection controller changes the lift amount to the small lift amount smaller than the large lift amount while continuously injecting the fuel. As a result, the flow of the fuel is such that the injection speed of the fuel is further increased without a decrease in the flow rate of the injection due to the inertial dynamic effect. In this way, the fuel spray that has been injected in the later period of the injection period is blown in the combustion chamber while receiving a large resistance. Thus, this facilitates atomization of the fuel. As a result, after the end of the fuel injection, fuel vaporization and fuel-air mixing finish quickly. This reduces generation of smoke.

Accordingly, the above configuration allows the fuel injection end timing to come close to the compression top dead center. Thus, the configuration also makes it possible to retard the fuel injection start timing. Therefore, the fuel injection can be started with the pressure and temperature in the cylinder being relatively high. Thus, this can reduce the risk of the air-fuel mixture reaching the wall surface of the combustion chamber. That is to say, this reliably enables formation of the air-fuel mixture layer and the heat-insulating gas layer in the combustion chamber while reducing generation of smoke.

The fuel injection controller may inject the fuel in the lift amount changing mode when the engine body is operated at a rotational speed which falls within a predetermined high rotational speed range, and may inject the fuel in a mode in which the lift amount of the fuel injection valve is constant in the earlier and later periods of the injection period when the engine body is operated at a rotational speed which falls within a low rotational speed range where a rotational speed is lower than that in the high rotational speed range.

As described above, the fuel injection in the lift amount changing mode allows the fuel injection end timing to come close to the compression top dead center. Thus, this is advantageous in reducing generation of smoke while reliably forming the air-fuel mixture layer and the heat-insulating gas layer in the combustion chamber in a situation where the engine body is operated at the rotational speed which falls within the high rotational speed range.

On the other hand, when the engine body is operated at the rotational speed which falls within the low rotational speed range, the time taken to change the crank angle is prolonged. In this situation, unlike at the rotational speed which falls within the high rotational speed range, it is not strongly required that atomization of the fuel be facilitated to finish fuel vaporization and fuel-air mixing within a short period of time. Therefore, when the engine body is operated at the rotational speed which falls within the low rotational speed range, the fuel is injected in the mode in which the lift amount is constant in the earlier and later periods of the injection period. This allows the injection speed not to increase suddenly in the midway of the fuel injection. Thus, this reduces the risk of the subsequently injected fuel spray overlapping with the previously injected fuel spray to locally form an excessively concentrated air-fuel mixture.

In the low rotational speed range, it is unnecessary to advance the fuel injection start timing. Thus, it becomes possible to start the fuel injection after the pressure and temperature in the cylinder reach a high value. In this way, when the engine body is operated at the operational speed which falls within the low rotational speed range, it is possible to reliably form the air-fuel mixture layer and the heat-insulating gas layer in the combustion chamber while reducing generation of smoke due to the local formation of an excessively concentrated air-fuel mixture.

The fuel injection controller may perform, when the engine body is operated at a rotational speed which falls within a predetermined high rotational speed range, a second-stage injection in which the fuel is injected in the lift amount changing mode, and before the second-stage injection, a first-stage injection in which the fuel is injected with a lift amount smaller than the large lift amount for an injection period longer than that in the second-stage injection.

In the fuel injection valve, which is configured such that the larger the lift amount is, the larger the effective opening area of the injection port through which the fuel is injected, as described above, if the lift amount is increased to increase the effective opening area of the injection port, the fuel injection speed increases quickly after the start of fuel injection. Conversely, if the lift amount is decreased to decrease the effective opening area of the injection port, the resistance applied on the fuel is increased, and thus, the fuel injection speed is less likely to increase after the start of fuel injection. With such characteristics, an increase in the lift amount of the fuel injection valve and a decrease in the injection period allow the fuel injection speed to increase quickly after the start of fuel injection. However, the injection speed reaches a relatively low value. On the other hand, a decrease in the lift amount of the fuel injection valve and an increase in the injection period allow the fuel to be injected at a low speed immediately after the start of fuel injection. However, the injection speed reaches a relatively high value in the later period.

According to the above configuration, when the engine body is operated at the operational speed which falls within the high rotational speed range, fuel injection is performed several times, i.e., the first-stage and second-stage injections. When such a split injection is performed, an increase in the interval between the injections (i.e., prolonging the idle period between the injections) reduces the risk of the subsequently injected fuel spray overlapping with the previously injected fuel spray to locally form an excessively concentrated air-fuel mixture. This reduces generation of smoke.

However, an increase in the engine rotational speed decreases the time taken to change the crank angle, thereby decreasing the idle period between the injections. The spray flow formed in the combustion chamber by the fuel injection injected from the fuel injection valve involves the surrounding air (or gas including the air). However, the decrease in the idle period between the injections allows the subsequently injected fuel spray to be attracted to the air flow produced by the previously injected fuel spray, thereby allowing the subsequently injected fuel spray to overlap with the previously injected fuel spray.

The above configuration, when performing the fuel injection several times, reduces the risk of the air-fuel mixture layer reaching the wall surface of the combustion chamber while reducing the risk of the subsequently injected fuel spray overlapping with the previously injected fuel spray. Specifically, according to the above configuration, the first-stage injection in which the lift amount is low and the injection period is long is performed. As a result, the fuel injection speed is initially slow after the start of injection, thereby making it difficult for the fuel spray injected in the first-stage injection to be blown. Since the injection timing in the first-stage injection is advanced, the risk of the fuel spray reaching the wall surface of the fuel injection valve is reduced though the pressure and temperature in the cylinder are low. In this way, it becomes possible to form the heat-insulating gas layer around the air-fuel mixture layer.

The second-stage injection performed after the first-stage injection is fuel injection performed in the lift amount changing mode. Therefore, the lift amount at the start of injection is relatively large. As described above, in the second-stage injection, the fuel injection speed is initially high after the start of injection. The second-stage injection may be suitably performed in the terminal period of the compression stroke. The spray flow formed in the combustion chamber by the fuel injection in the first-stage injection involves the surrounding air (or gas including the air). However, the fuel injection speed is high in the second-stage injection, and thus, the effect of the air flow by the injection in the first-stage injection is less likely to be provided. In particular, although, in the high rotational speed range, the idle period between the first-stage and second-stage injections tends to be short, the risk of the fuel spray injected in the second-stage injection being attracted by the air, and overlapping with the fuel spray injected in the first-stage injection is reduced. This reduces local formation of an excessively concentrated air-fuel mixture, thereby reducing generation of smoke.

The second injection is performed in the lift amount changing mode, and thus, the fuel injection end timing can come close to the compression top dead center. Note that the second-stage injection is preferably ended at or before the time when the piston reaches the top dead center. Also, as described above, the idle period between the first-stage and second-stage injections may be short. Accordingly, it is unnecessary to advance the injection start timing in the first-stage injection. This is advantageous in reducing the risk of the fuel spray injected in the first-stage injection reaching the wall surface of the combustion chamber.

Furthermore, the spray flow formed in the combustion chamber by the fuel injection injected from the fuel injection valve involves the surrounding air, as described above. At that time, the fuel spray is sprayed so as to spread from the tip portion of the fuel injection valve. However, the air is less likely to enter a portion around the injection axis of the fuel injection valve located inwardly from the fuel spray injected. The longer the injection period is, the stronger the negative pressure around the injection axis of the fuel injection valve is. As a result, the fuel spray comes close to the injection axis of the fuel injection valve due to the pressure difference between the inside and outside of the fuel spray.

The injection period in the first-stage injection is relatively prolonged, and thus, the fuel spray injected in the first-stage injection tends to be located inwardly relative to an angle direction of the spray angle due to the above-described pressure difference. By contrast, the injection period in the second-stage injection is relatively short, and thus, the fuel spray injected in the second-stage injection tends to be located outwardly relative to the angle direction of the spray angle, compared with the fuel spray injected in the first-stage injection. In this way, the fuel spray injected in the first-stage injection and the fuel spray injected in the second-stage injection are shifted from each other not only in the injection direction but also in the angle direction of the spray angle. In this way, the risk of local formation of an excessively concentrated air-fuel mixture is reduced. Also, the fuel spray injected in the first-stage injection is different from that injected in the second-stage injection in position. This improves the air utilization rate in the combustion chamber.

As a result, when the engine body is operated at the rotational speed which falls within the high rotational speed range, it is possible to reliably form the air-fuel mixture layer and the heat-insulating gas layer in the combustion chamber while reducing generation of smoke.

The fuel injection controller may perform, when the engine body is operated at a rotational speed which falls within a low rotational speed range where a rotational speed is lower than that in the high rotational speed range, a first-stage injection in a mode in which the lift amount of the fuel injection valve is constant in the earlier and later periods of the injection period, and after the first-stage injection, a second-stage injection in which the fuel is injected with a lift amount smaller than that in the first-stage injection for an injection period longer than that in the first-stage injection.

According to this configuration, when the engine body is operated at the rotational speed which falls within the low rotational speed range, the first-stage injection is performed in a mode in which the lift amount of the fuel injection valve is constant in the earlier and later periods of the injection period. In the first-stage injection, the lift amount is higher than that in the second-stage injection, and the injection period is shorter than that in the second-stage injection. With such an injection manner, the fuel injection speed increases quickly after the start of fuel injection in the first-stage injection. The fuel spray injected in the first-stage injection reaches a position far from the fuel injection valve. This improves the air utilization rate in the combustion chamber.

In the first-stage injection, the lift amount is relatively large, and thus, the injection speed is not so high. Also, since the engine body is operated at a low rotational speed, a long idle period can be secured between the first-stage and second-stage injections. Therefore, the fuel injection start timing in the first-stage injection can be retarded. A part or the whole of the first-stage injection may be performed in the second half of the compression stroke. Note that the second half of the compression stroke means the latter half of a compression stroke period divided into two equal periods. Such a manner allows the pressure and temperature in the cylinder in the first-stage injection to reach a high value. Therefore, this reduces too long fuel spray to reduce the risk of the fuel spray reaching the wall surface of the combustion chamber. In this way, it becomes possible to form the heat-insulating gas layer around the air-fuel mixture layer.

In the second-stage injection, the lift amount is smaller than that in the first-stage injection, and the injection period is longer than that in the first-stage injection. With such an injection manner, in the second-stage injection, the fuel injection speed is initially low after the start of injection, as described above. This reduces the risk of the fuel spray injected in the second-stage injection reaching the fuel spray injected in the first-stage injection. Also, in the low rotational speed range, after a long idle period after the first-stage injection, the second-stage injection is performed. Therefore, this reduces the risk of the fuel spray injected in the second-stage injection being attracted to, and overlapping with the fuel spray in another injection. In this way, the fuel spray injected in the first-stage injection and the fuel spray injected in the second-stage injection are also shifted from each other in the injection direction.

Also, as described above, the fuel spray injected in the first-stage injection and the fuel spray injected in the second-stage injection are also shifted from each other in the angle direction of the spray angle. As a result, generation of smoke is reduced.

The fuel injection controller may inject the fuel in the lift amount changing mode in the terminal period of the compression stroke when the engine body is operated with a load which falls within a low load range where a load is lower than a predetermined load at a rotational speed which falls within the high rotational speed range, and may perform, when the engine body is operated with a load which falls within a high load range where a load is higher than that in the low load range at a rotational speed which falls within the high rotational speed range, a second-stage injection in which the fuel is injected in the lift amount changing mode, and before the second-stage injection, a first-stage injection in which the fuel is injected with a lift amount smaller than the large lift amount for an injection period longer than that in the second-stage injection.

In the low rotational speed range, the fuel injection amount is relatively decreased. Thus, in a situation where the load is low and the rotational speed falls within the high rotational speed range, the fuel is injected in the terminal period of the compression stroke in the lift amount changing mode. That is to say, single-stage injection is performed. As a result, as described above, fuel vaporization and fuel-air mixing are performed within a short period of time to allow for forming the heat-insulating gas layer around the air-fuel mixture layer while reducing generation of smoke.

By contrast, an increase in the load of the engine body increases the fuel injection amount. When the engine body is operated with a load which falls within a high load range where a load is higher than that in the low load range at a rotational speed which falls within the high rotational speed range, the second-stage injection in which the fuel is injected in the lift amount changing mode is performed, and before the second-stage injection, a first-stage injection in which the fuel is injected with a lift amount smaller than the large lift amount for an injection period longer than that in the second-stage injection is performed. That is to say, a multi-stage injection is performed. This allows for forming the heat-insulating gas layer around the air-fuel mixture layer while reducing generation of smoke even if the fuel injection amount is increased.

Advantages of the Invention

As described above, the fuel injection control device for a direct-injection engine injects the fuel into the combustion chamber in the terminal period of the compression stroke in the lift amount changing mode wherein the lift amount is set to the large lift amount in the earlier period of the injection period and to the small lift amount in the later period of the injection period, thereby facilitating atomization of the fuel. This allows for reliably forming the air-fuel mixture layer and the gas layer around the air-fuel mixture layer in the combustion chamber while reducing generation of smoke.

Figure 4:
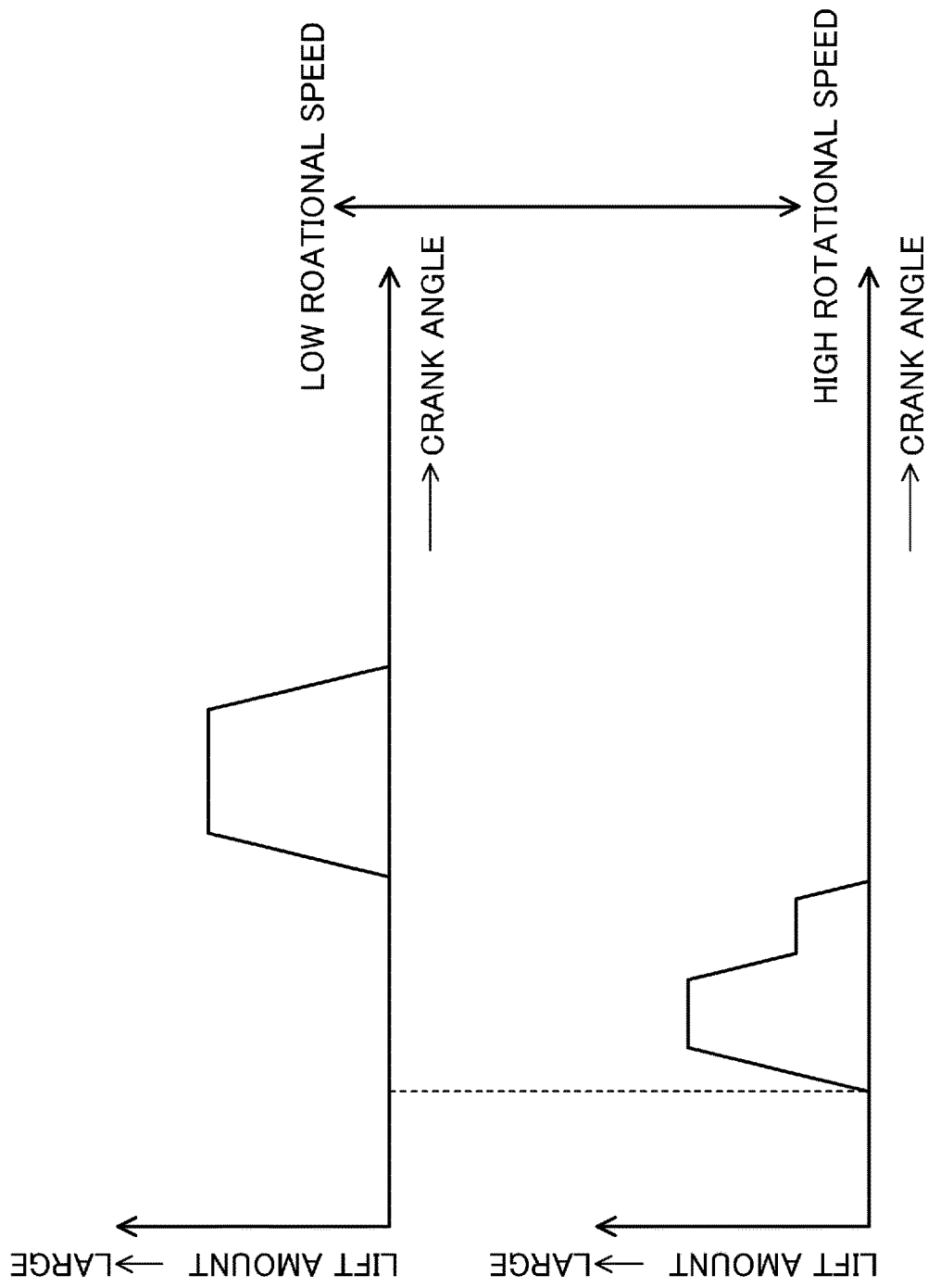

The upper figure of FIG. 4 shows a fuel injection manner with a low load and in a low rotational speed range, and the lower figure of FIG. 4 shows a fuel injection manner with the low load and in a high rotational speed range.

Figure 5:
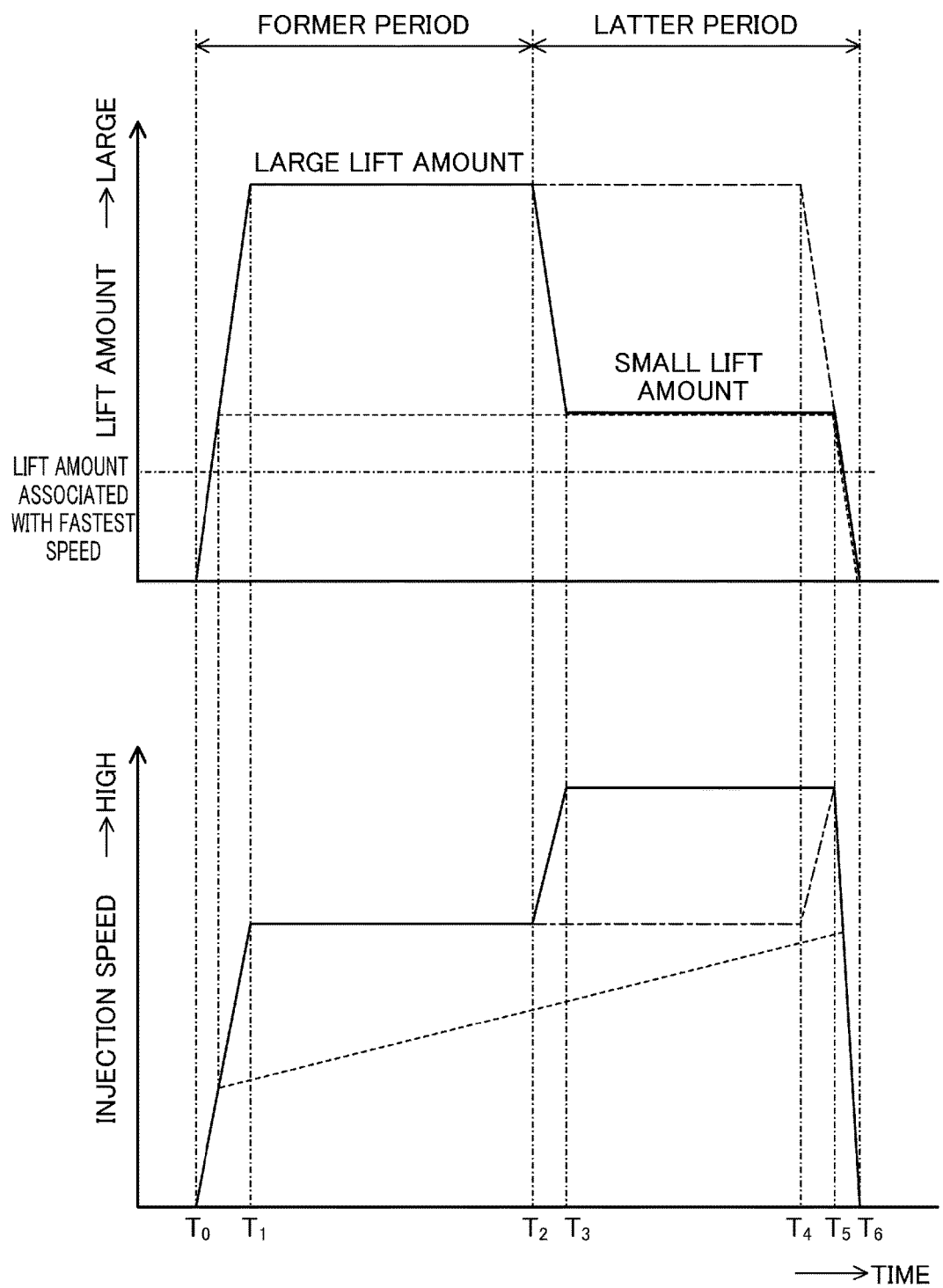

The upper figure of FIG. 5 shows a change in the lift amount of the fuel injection valve, and the lower figure of FIG. 5 shows a change in the fuel injection speed.

Figure 6:
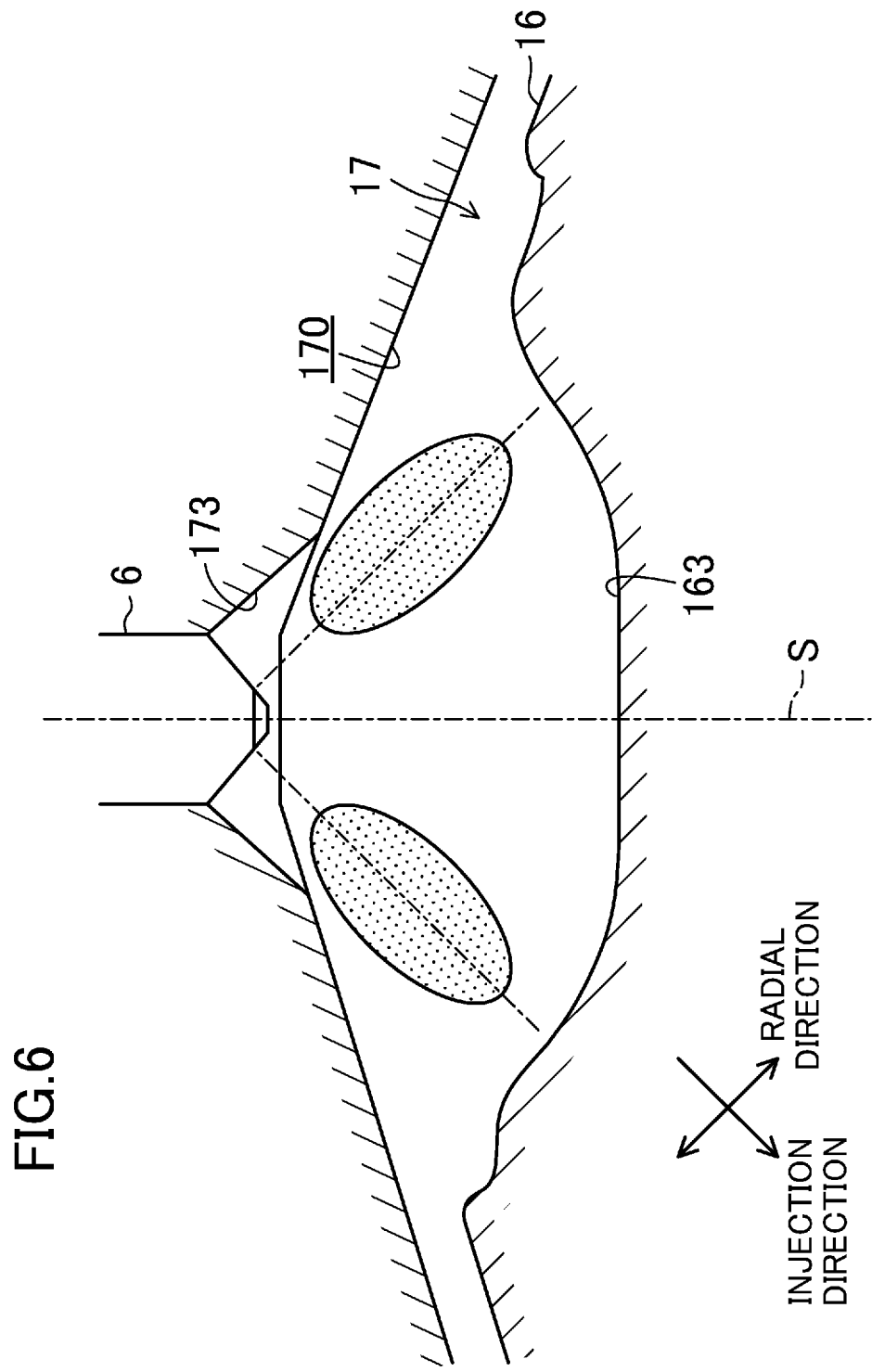

FIG. 6 conceptually illustrates the spread of fuel spray in the combustion chamber with the low load and at the low rotational speed.

Figure 7:
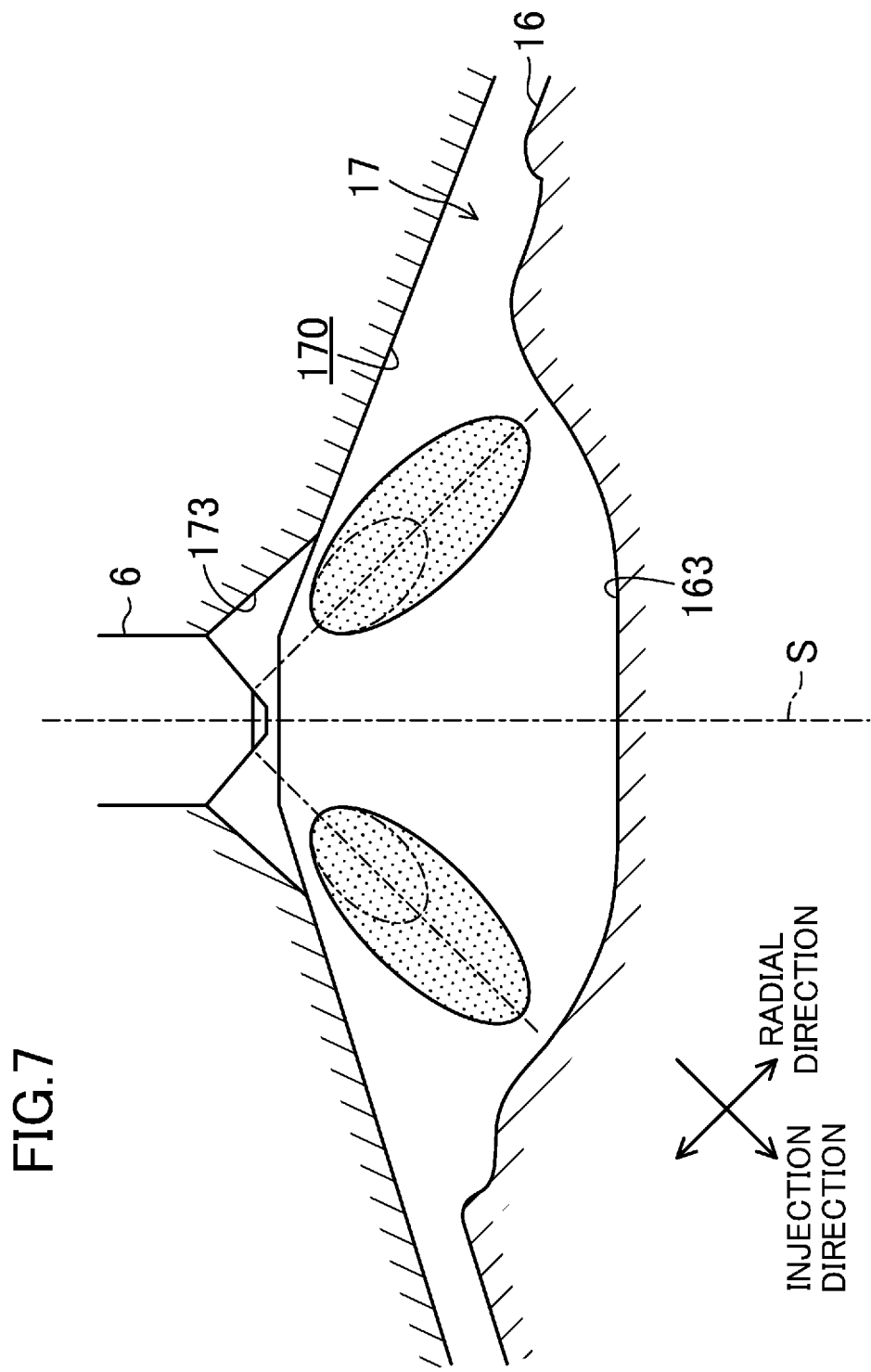

FIG. 7 conceptually illustrates the spread of the fuel spray in the combustion chamber with the low load and at the high rotational speed.

Figure 8:
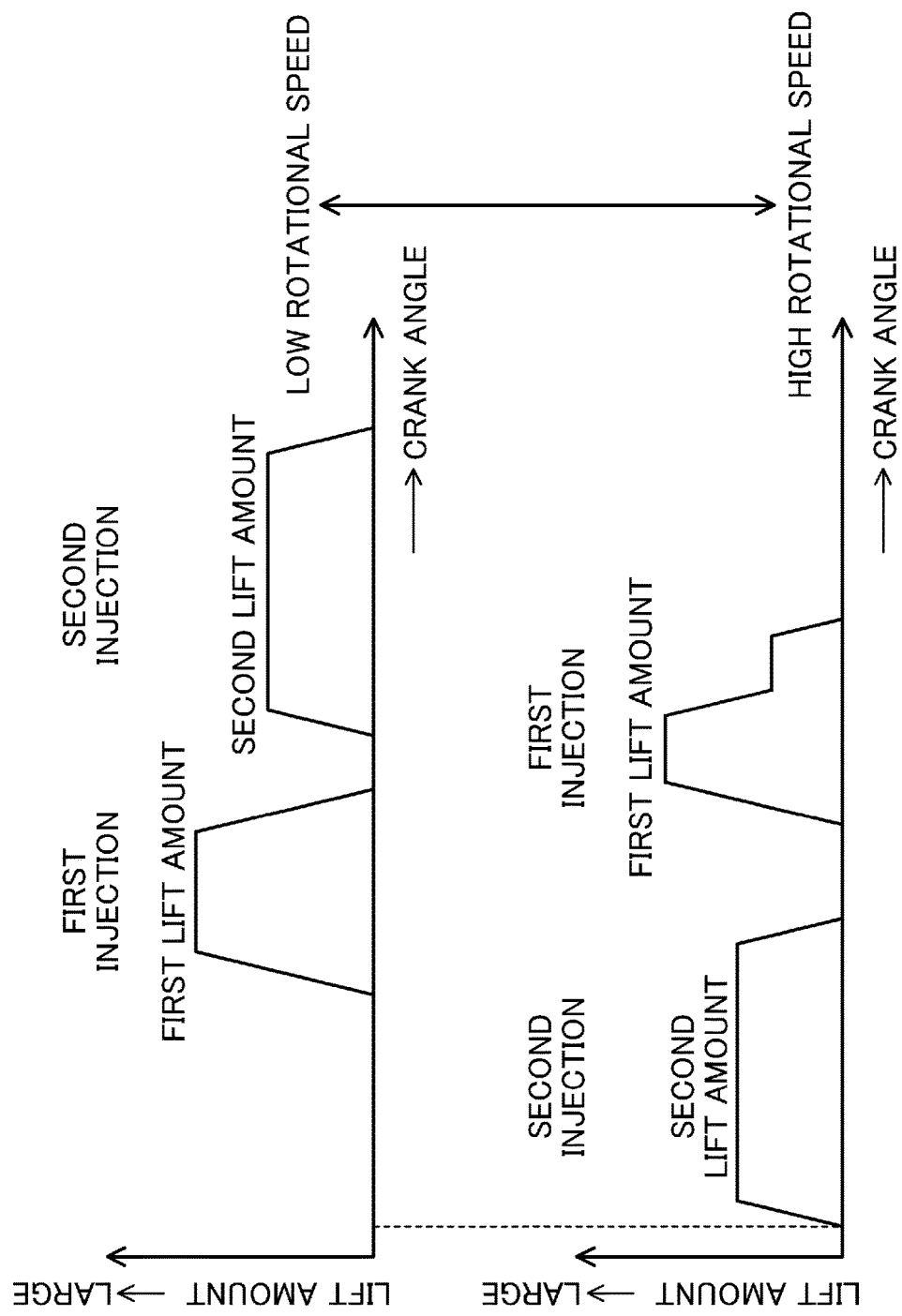

The upper figure of FIG. 8 shows a fuel injection manner with a middle load and in the low rotational speed range, and the lower figure of FIG. 8 shows a fuel injection manner with the middle load and in the high rotational speed range.

Figure 9:
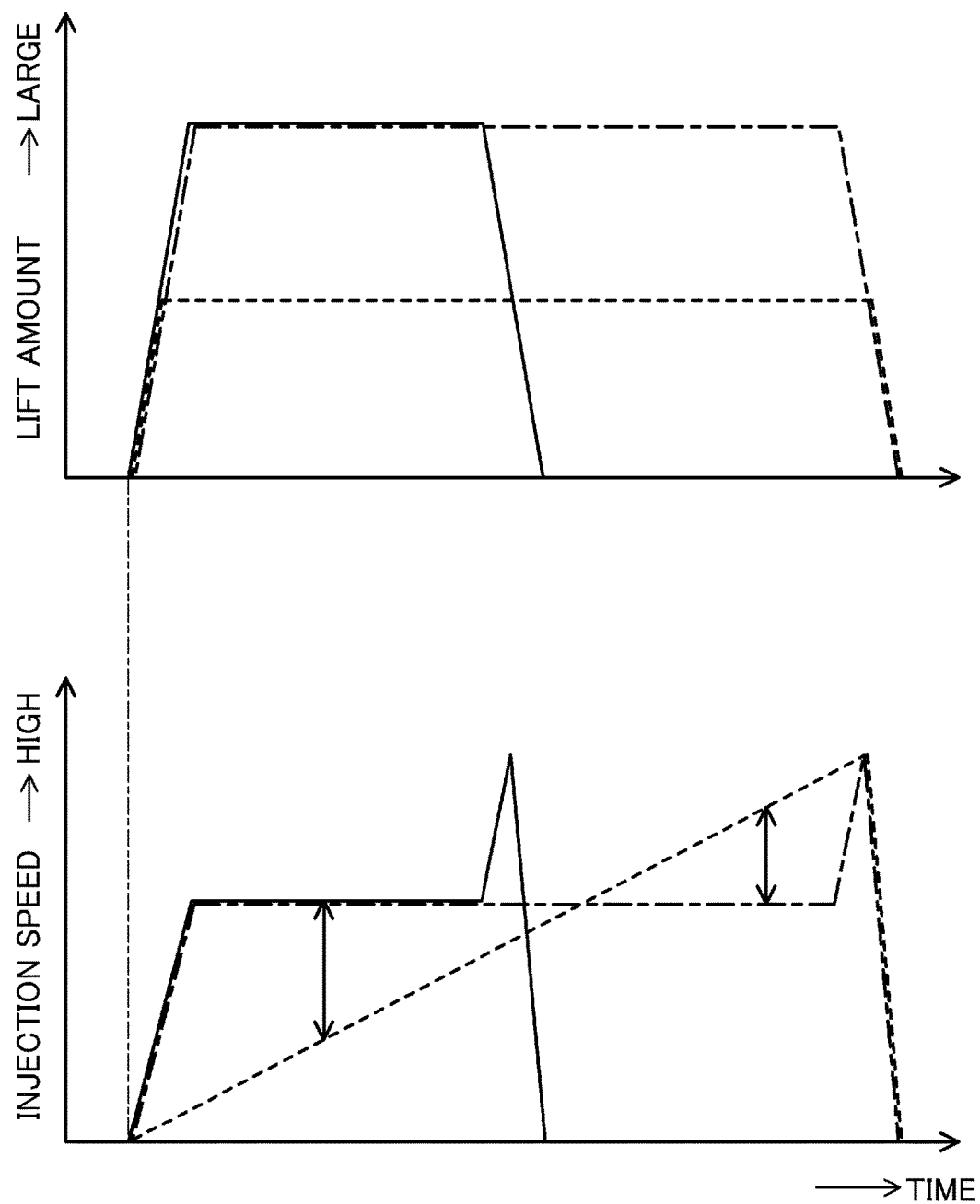

The upper figure of FIG. 9 shows a difference in the lift amount of the fuel injection valve, and the lower figure of FIG. 9 shows a difference in the fuel injection speed.

Figure 10:
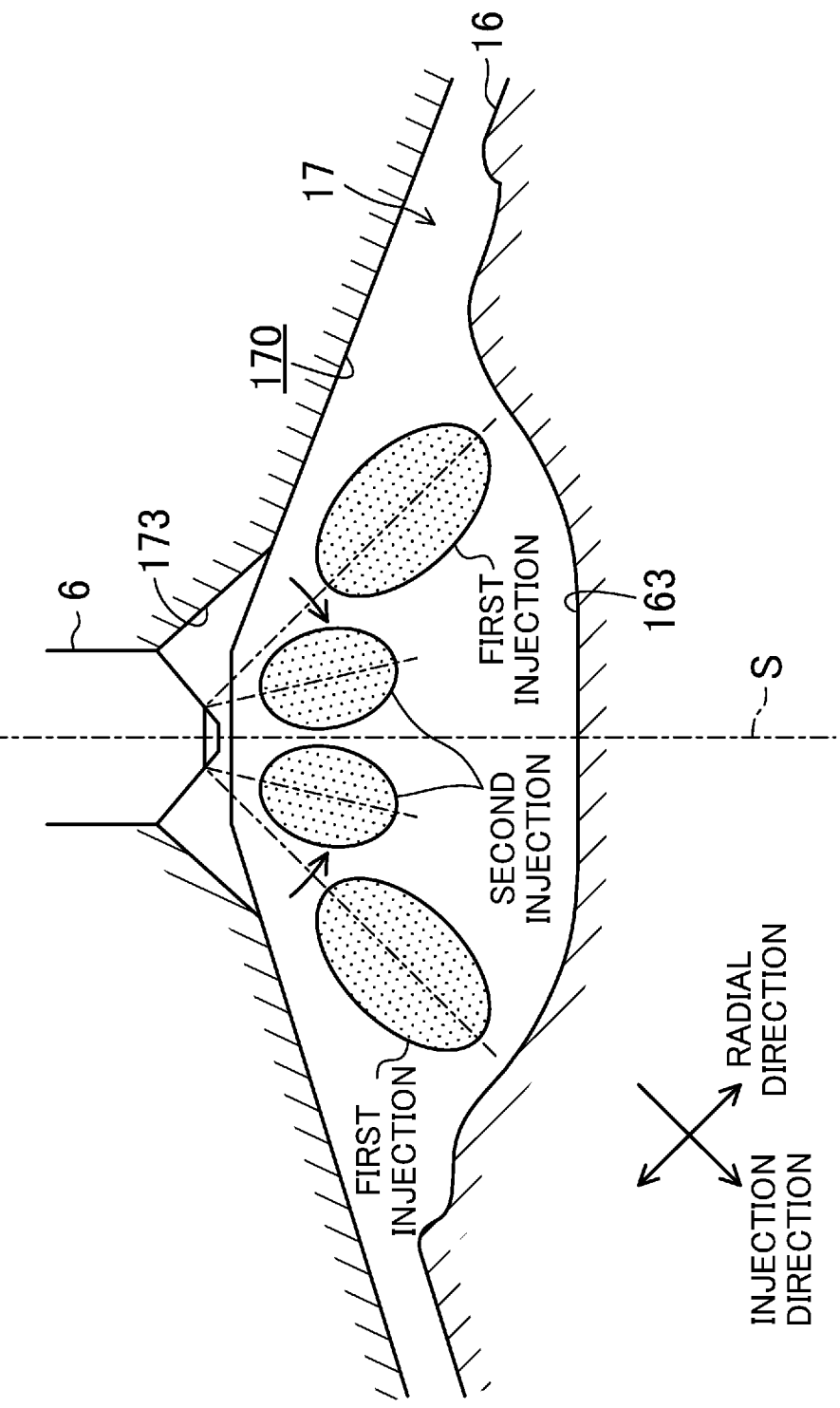

FIG. 10 conceptually illustrates the spread of the fuel spray in the combustion chamber with the middle load and at the low rotational speed.

Figure 11:
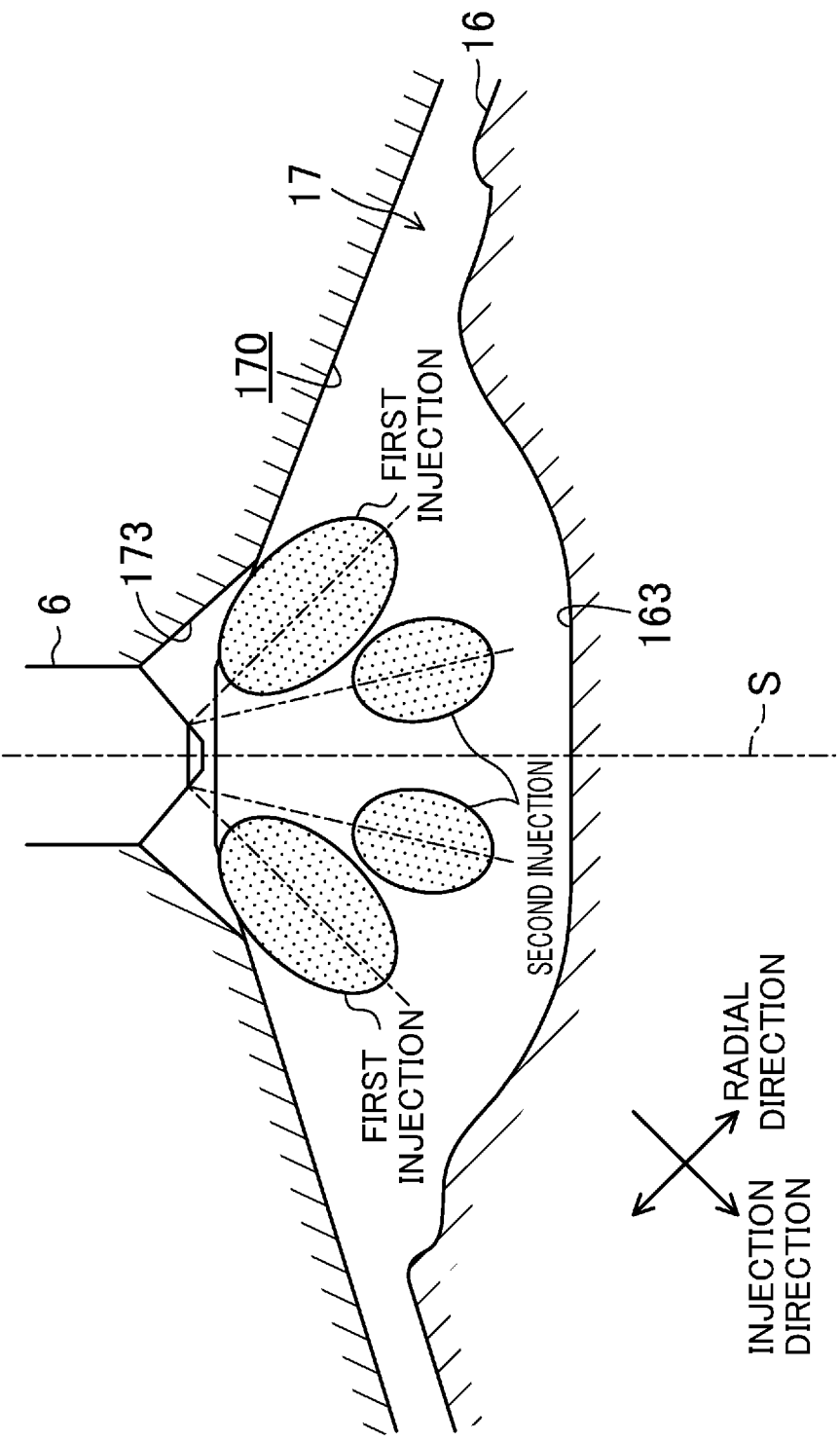

FIG. 11 conceptually illustrates the spread of the fuel spray in the combustion chamber with the middle load and at the high rotational speed.

Figure 12:
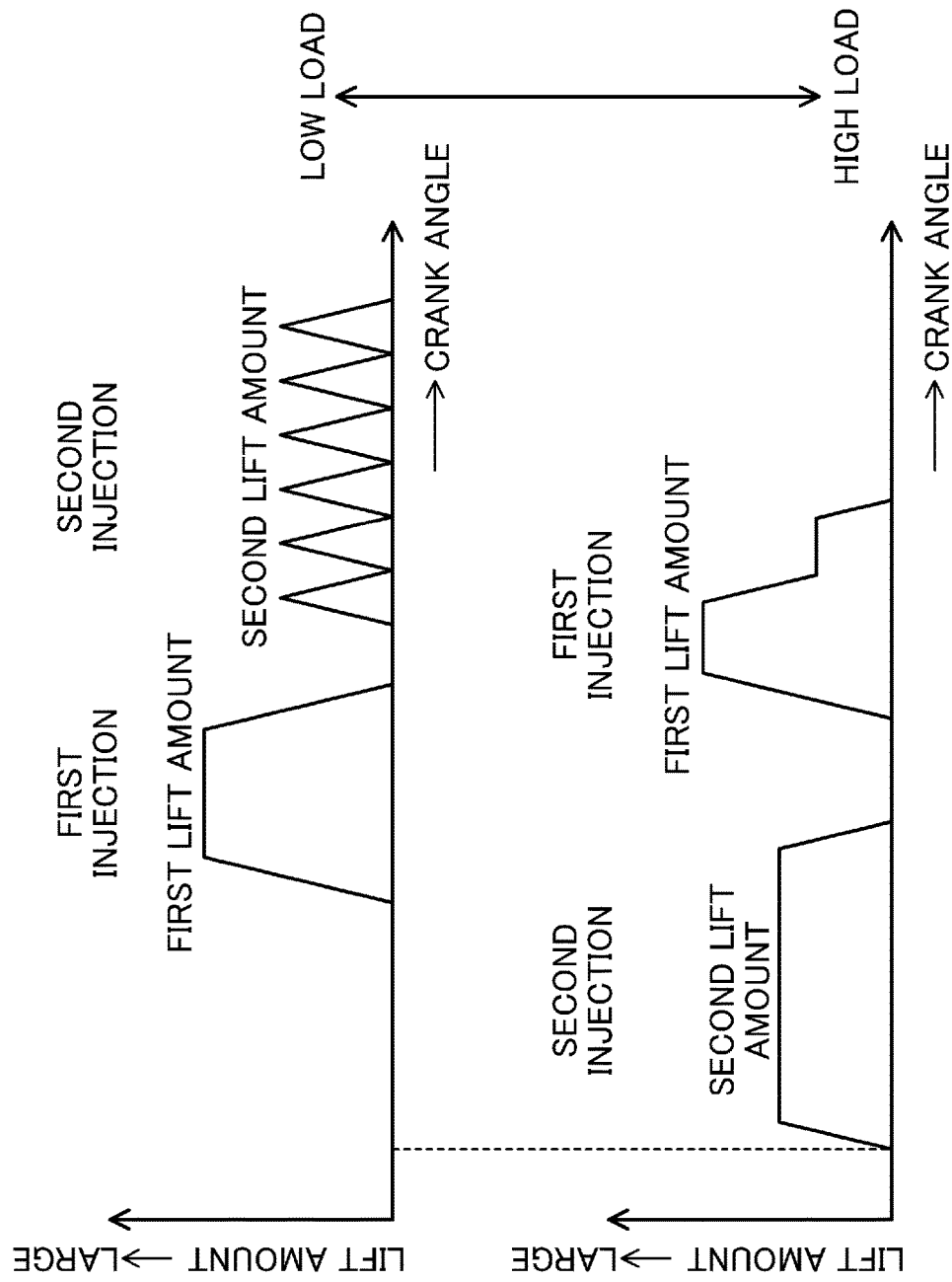

FIG. 12 shows another fuel injection manner different from that in FIG. 8, and the upper figure of FIG. 12 shows a fuel injection manner with the middle load and in the low rotational speed range, and the lower figure of FIG. 12 shows a fuel injection manner with the middle load and in the high rotational speed range.

DESCRIPTION OF EMBODIMENTS

Exemplary embodiments of the present disclosure will now be described in detail with reference to the drawings. The following description is illustrative.

(Entire Configuration for Engine)

Figure 1:
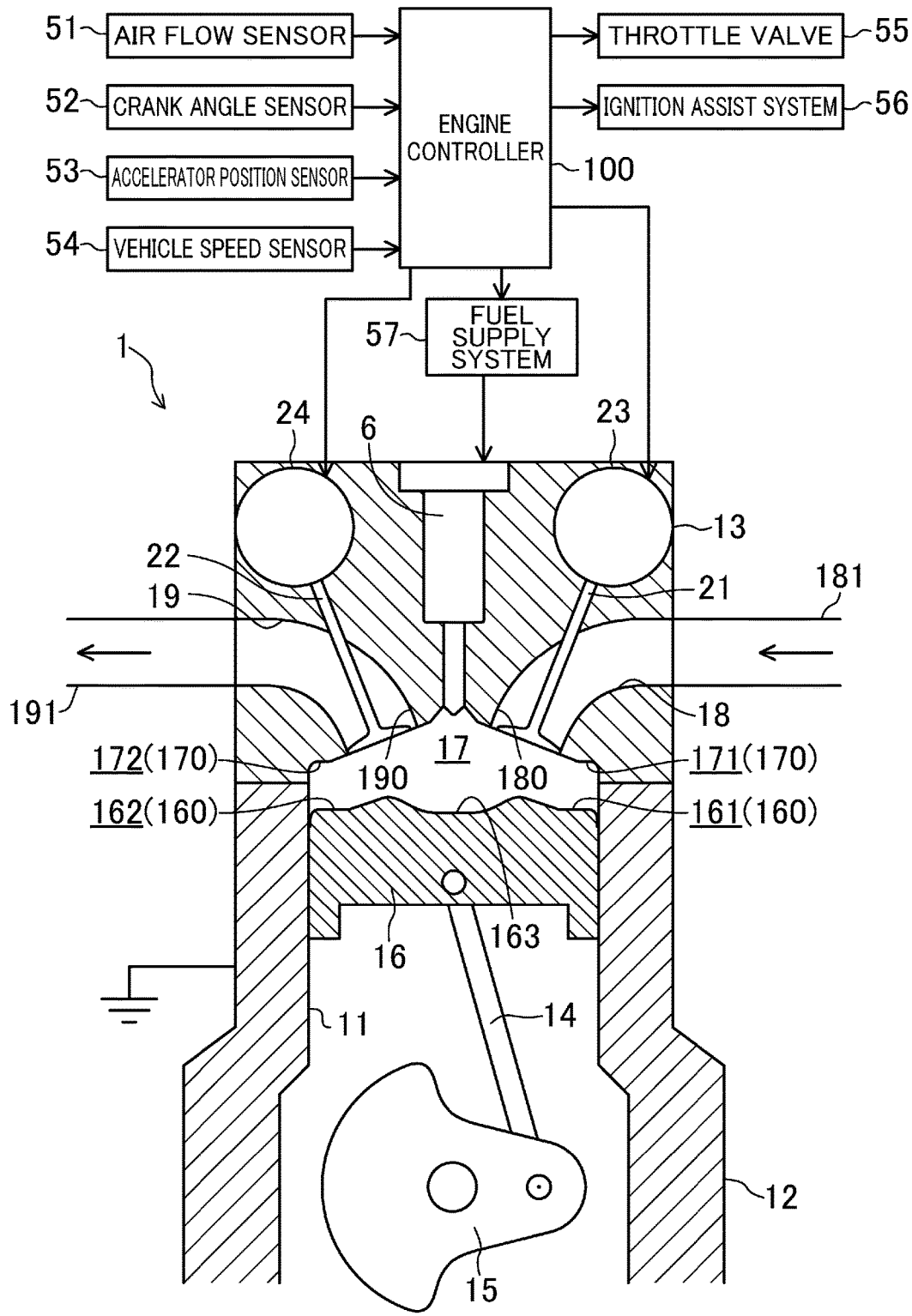
FIG. 1 is a schematic view illustrating the configuration for a direct-injection engine.

FIG. 1 illustrates the configuration for an engine 1 according to an embodiment. Although not illustrated, a crankshaft 15 of the engine 1 is coupled to driving wheels through a transmission. Transmitting the output of the engine 1 to the driving wheels propels a vehicle. In this embodiment, fuel for the engine 1 is gasoline. However, the fuel may also be, for example, gasoline containing bioethanol. The technique disclosed herein can be widely applied to engines using various types of liquid fuel in premix combustion engines in which fuel is vaporized after fuel injection and is ignited.

The engine 1 includes a cylinder block 12, and a cylinder head 13 mounted on the cylinder block 12. A plurality of cylinders 11 are formed inside the cylinder block 12 (only one of these cylinders is illustrated in FIG. 1). The engine 1 is a multi-cylinder engine. Although not illustrated, a water jacket, through which cooling water runs, is formed inside the cylinder block 12 and the cylinder head 13. A piston 16, which is coupled to the crankshaft 15 through a connecting rod 14, is slidably fitted into each of the cylinders 11. The piston 16 defines a combustion chamber 17 along with the cylinder 11 and the cylinder head 13.

Figure 2:
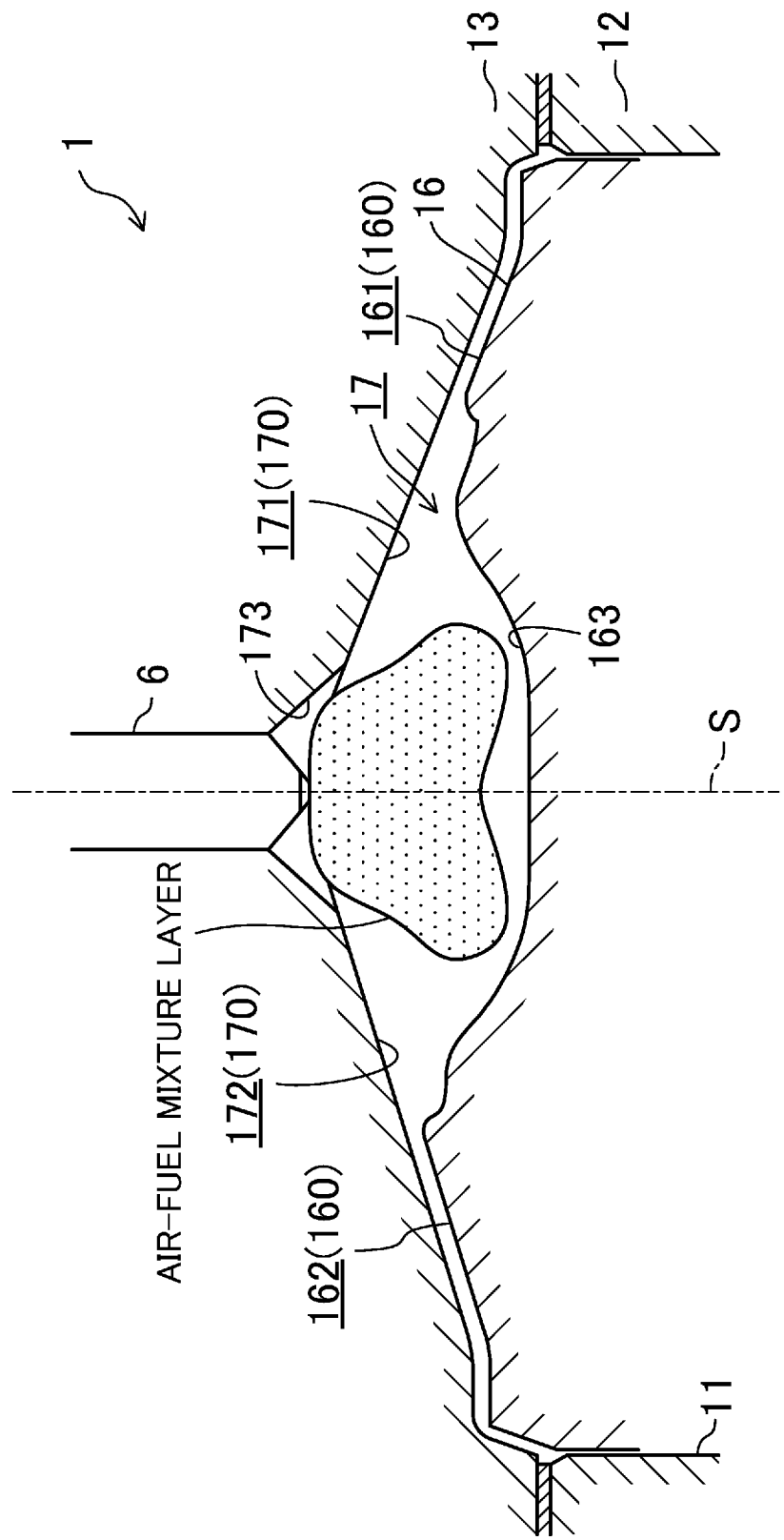
FIG. 2 is a cross-sectional view illustrating the configuration of a combustion chamber.

In this embodiment, a ceiling portion 170 of the combustion chamber 17 (a lower surface of the cylinder head 13) has an intake side inclined surface 171 and an exhaust side inclined surface 172, which are inclined upward toward a center of the cylinder 11. The intake side inclined surface 171 is provided with an opening 180 of an intake port 18. The exhaust side inclined surface 172 is provided with an opening 190 of an exhaust port 19. The combustion chamber 17 is a pent-roof-shaped combustion chamber. Note that a ridge line of the pent roof may either coincide or not coincide with a bore center of the cylinder 11. As illustrated in FIG. 2, the top surface 160 of the piston 16 has inclined surfaces 161 and 162, which are inclined upward toward the center of the piston 16 on the intake and exhaust sides respectively, to correspond to the intake side inclined surface 171 and the exhaust side inclined surface 172 of the ceiling portion 170. The top surface 160 is raised such that the inclined surfaces 161 and 162 form a triangular roof. Thus, the geometric compression ratio of the engine 1 is set high, i.e., equal to or higher than 15. The top surface 160 of the piston 16 has a recessed cavity 163.

Although only one of the intake ports is illustrated in FIG. 1, actually two intake ports 18 are provided for the cylinder head 13 of each cylinder 11. The intake side inclined surface 171 of the cylinder head 13 is provided with the openings 180 of the two intake ports 18, which are arranged side by side along the engine's output shaft (i.e., along the crankshaft 15). The intake ports 18 communicate with the combustion chamber 17 through the respective openings 180. Likewise, two exhaust ports 19 are provided for the cylinder head 13 of each cylinder 11. The exhaust side inclined surface 172 of the cylinder head 13 is provided with the openings 190 of the exhaust ports 19, which are arranged side by side along the engine's output shaft. The exhaust ports 19 communicate with the combustion chamber 17 through the respective openings 190.

The intake ports 18 are each connected to an intake passage 181. A throttle valve 55 which controls the flow rate of intake air is arranged in the intake passage 181. The exhaust ports 19 are each connected to an exhaust passage 191. Although not illustrated, the exhaust passage 191 is provided with an exhaust gas purifying system having one or more catalyst converters. The catalyst converter includes a three-way catalyst. The catalyst converter is not limited to the three-way catalyst.

The cylinder head 13 is provided with an intake valve 21, which blocks the intake port 18 from the combustion chamber 17 (i.e., closes the combustion chamber 17). The intake valve 21 is driven by an intake valve drive mechanism. The cylinder head 13 is also provided with an exhaust valve 22, which blocks the exhaust port 19 from the combustion chamber 17. The exhaust valve 22 is driven by an exhaust valve drive mechanism. The intake valve 21 reciprocates at a predetermined timing to open and close the intake port 18. The exhaust valve 22 reciprocates at a predetermined timing to open and close the exhaust port 19. In this manner, gas is exchanged in the cylinder 11.

Although not illustrated, the intake valve drive mechanism includes an intake camshaft drive-connected to the crankshaft 15. The intake camshaft rotates in synchronization with the crankshaft 15 rotating. Although not illustrated, the exhaust valve drive mechanism includes an exhaust camshaft drive-connected to the crankshaft 15. The exhaust camshaft rotates in synchronization with the crankshaft 15 rotating.

In this example, the intake valve drive mechanism includes at least hydraulic or electric variable valve timing (VVT) mechanism 23 capable of continuously changing the phase of the intake camshaft within a predetermined angular range. The intake valve drive mechanism may include, in addition to the VVT mechanism 23, a variable valve lift mechanism capable of changing a valve lift amount.

In this example, the exhaust valve drive mechanism includes at least hydraulic or electric variable valve timing (VVT) mechanism 24 capable of continuously changing the phase of the exhaust camshaft within a predetermined angular range. The exhaust valve drive mechanism may include, in addition to the VVT mechanism 24, a variable valve lift mechanism capable of changing a valve lift amount.

The variable valve lift mechanism may be a continuous variable valve lift (CVVL) mechanism capable of continuously changing the valve lift amount. The valve drive mechanisms driving the intake valve 21 and the exhaust valve 22 may be of any type. Examples of adoptable valve drive mechanisms include hydraulic and electromagnetic drive mechanisms.

As illustrated at an enlarged scale in FIG. 2, a fuel injection valve 6 which directly injects fuel into the combustion chamber 17 is attached to the cylinder head 13. The fuel injection valve 6 is arranged on the ridge line of the pent roof at which the intake side inclined surface 171 and the exhaust side inclined surface 172 intersect with each other. The fuel injection valve 6 has an injection axis S extending along the axis of the cylinder 11, and an injection tip facing an interior of the combustion chamber 17. The injection axis S of the fuel injection valve 6 may coincide with or be shifted from the axis of the cylinder 11.

The cavity 163 of the piston 16 is provided to face the fuel injection valve 6. The fuel injection valve 6 injects fuel into the cavity 163.

The fuel injection valve 6 here is an outwardly-opening fuel injection valve. The outwardly-opening fuel injection valve 6 includes a nozzle body 60 having an injection port 61 through which fuel is injected, and an outwardly-opening valve 62 opening/closing the injection port 61, as the tip portion thereof is illustrated at an enlarged scale in FIG. 3.

The nozzle body 60 has a tubular shape and allows the fuel to flow through the inside of the nozzle body 60. The injection port 61 is provided at the tip portion of the nozzle body 60. The injection port 61 is tapered such that its diameter is gradually increased toward the tip.

Figure 3:
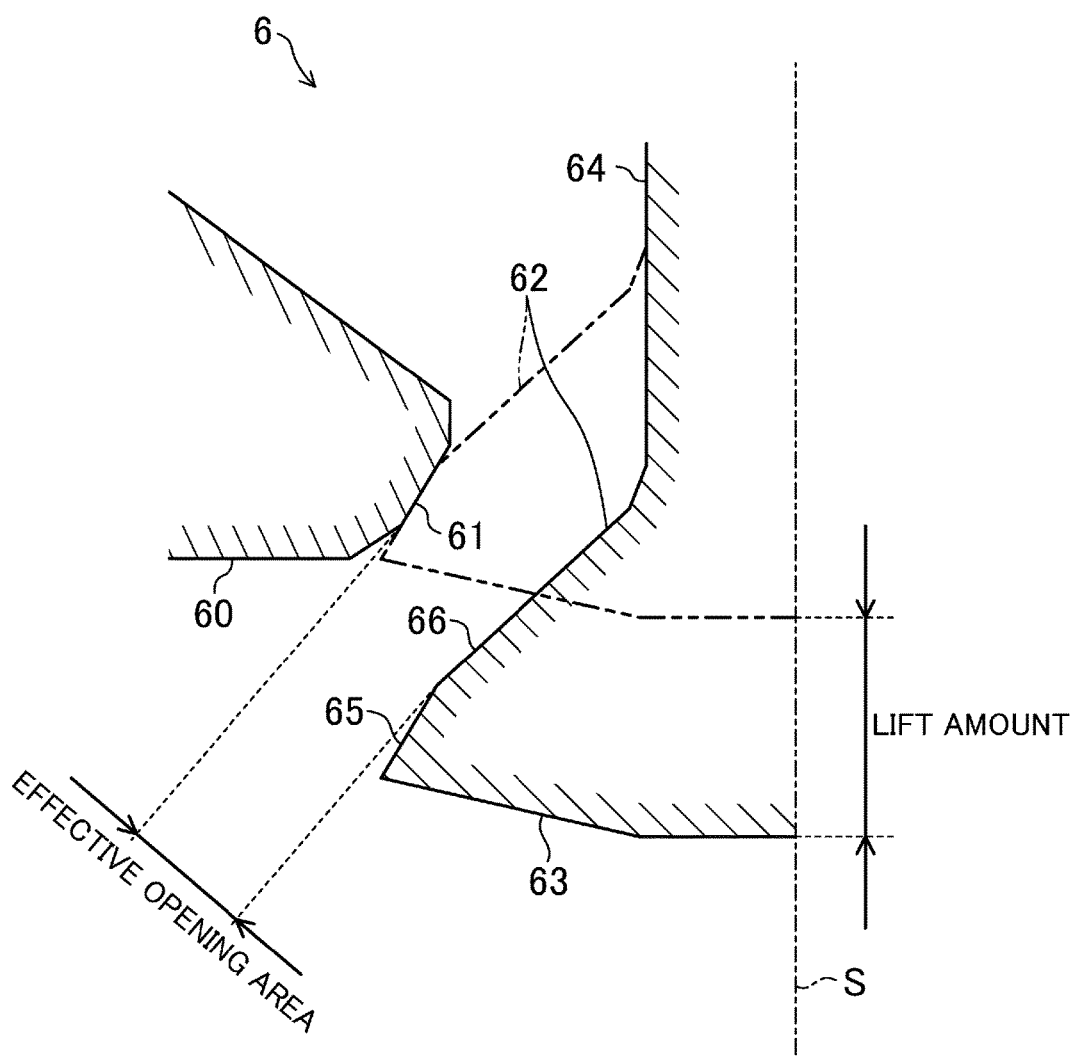
FIG. 3 illustrates a relationship between the lift amount of an outwardly-opening fuel injection valve and the effective opening area of an injection port.

The outwardly-opening valve 62 has a valve body 63 and a connecting portion 64. The valve body 63 is exposed to the outside of the nozzle body 60 from the tip of the nozzle body 60. The connecting portion 64 extends from the valve body 63, passes through the inside of the nozzle body 60, and is connected to a piezoelectric element which is not illustrated. The valve body 63 has a seat portion 65 having substantially the same shape as the tapered injection port 61. A diameter-reducing portion 66 is interposed between the seat portion 65 and the connecting portion 64 of the valve body 63. As illustrated in FIG. 3, inclination differs between the diameter-reducing portion 66 and the seat portion 65, and the diameter-reducing portion 66 extending from the proximal end toward the tip is inclined more gently than the seat portion 65.

As indicated by the dash-dot-dot line in FIG. 3, the injection port 61 is closed when the seat portion 65 abuts on the injection port 61. The piezoelectric element is deformed by voltage application, thereby outwardly lifting the outwardly-opening valve 62 along the injection axis S. Along this, as indicated by the solid line in FIG. 3, the seat portion 65 moves away from the injection hole 61 to allow the injection port 61 to be opened. When the injection port 61 is opened, the fuel is injected from the injection port 61 in a direction which is inclined with respect to the injection axis S and which causes the fuel to spread radially outward from the injection axis S. The fuel is injected in the form of a hollow cone with the injection axis S as its central axis. When the voltage application to the piezoelectric element stops, the piezoelectric element returns to its original shape, so that the seat portion 65 of the outwardly-opening valve 62 abuts on the injection port 61 to close the injection port 61 again.

As the voltage applied to the piezoelectric element increases, the lift amount of the outwardly-opening valve 62 from the state closing the injection port 61 increases. As is clear from FIG. 3, the larger the lift amount is, the greater the degree of opening (i.e., the effective opening area) of the injection port 61 becomes. The effective opening area is defined by the distance between the injection port 61 and the seat portion 65. The larger the lift amount is, the greater the size of the particles of the fuel sprayed from the injection port 61 into the combustion chamber 17 becomes. Conversely, the smaller the lift amount is, the smaller the size of the particles of the fuel sprayed from the injection port 61 into the combustion chamber 17 becomes. When fuel passes through the injection port 61, it flows along the diameter-reducing portion 66. The greater the lift amount is, the narrower the spray angle (i.e., the cone angle of the hollow cone) of the fuel becomes since the diameter-reducing portion 66 moves away from the injection port 61. The smaller the lift amount is, the wider the spray angle (i.e., the cone angle of the hollow cone) of the fuel becomes since the diameter-reducing portion 66 comes closer to the injection port 61.

If the fuel pressure is constant, the greater the effective opening area is, the slower the injection speed becomes. Conversely, the smaller the effective opening area is, the faster the injection speed becomes. However, if the effective opening area becomes too small, the effect of the friction resistance of the fuel from the wall surface of the injection port increases, which results in a decrease in the injection speed. Thus, there exists a lift amount associated with the fastest injection speed of the fuel. If a lift amount is larger or smaller than the lift amount associated with the fastest injection speed, the injection speed of the fuel is decreased in either case. This lift amount associated with the fastest injection speed is relatively small.

As illustrated in FIG. 2, the ceiling portion 170 of the cylinder head 13 is provided with a recess 173 recessed from the ceiling surface thereof, and the tip portion of the fuel injection valve 6 is housed inside the recess 173. The inner peripheral surface of the recess 173 is inclined such that the recess 173 has a diameter increasing toward the inside of the combustion chamber 17. Disposing the tip portion of the fuel injection valve 6 at a position away from the ceiling surface of the cylinder head 13 can make a distance between the top surface 160 of the piston 16 and the tip portion of the fuel injection valve 6 as wide as possible when the piston 16 reaches a top dead center while the geometric compression ratio is increased. This is advantageous in forming a heat-insulating gas layer around an air-fuel mixture layer, which will be described later. The increase in the distance between the inner peripheral surface of the recess 173 and the tip portion of the fuel injection valve 6 makes it possible to reduce the risk of the fuel spray that has been injected from the fuel injection valve 6 adhering to the ceiling surface of the cylinder head 13 due to a Coanda effect.

A fuel supply system 57 includes an electrical circuit for driving the outwardly-opening valve 62, and a fuel supply system supplying the fuel to the fuel injection valve 6. The engine controller 100 outputs an injection signal with a voltage corresponding to the lift amount, to the electrical circuit at predetermined timing, thereby operating, via the electrical circuit, the outwardly-opening valve 62 so that a desired amount of the fuel is injected into the cylinder. When the injection signal is not output (i.e., when the injection signal has a voltage of zero), the injection port 61 is closed by the outwardly-opening valve 62. In this manner, the operation of the piezoelectric element is controlled by the injection signal from the engine controller 100. The engine controller 100 controls the operation of the piezoelectric element, thereby controlling fuel injection from the injection port 61 of the fuel injection valve 6, and the lift amount at the fuel injection. The piezoelectric element is highly responsive, and is capable of multi-stage injection, e.g., about twenty-time injections in a period of 1-2 msec. However, the means for driving the outwardly-opening valve 62 is not limited to the piezoelectric element.

Although not shown, the fuel supply system is provided with a high-pressure fuel pump and a common rail. The high-pressure fuel pump pressure-feeds the fuel supplied from a fuel tank through a low-pressure fuel pump, to the common rail, which stores the pressure-fed fuel at a predetermined fuel pressure. Then, the fuel injection valve 6 is operated (i.e., the outwardly-opening valve 62 is lifted) to inject the fuel stored in the common rail from the injection port 61. The engine controller 100 and the fuel injection valve 6 constitute a fuel injection controller.

The fuel injection controller is configured such that an air-fuel mixture layer (combustible) and a heat-insulating gas layer surrounding the air-fuel mixture layer may be formed in the combustion chamber 17 (i.e., in the cavity 163), as conceptually shown in FIG. 2. The fuel injection controller will be detailed later.

This engine 1 is configured to combust an air-fuel mixture formed in the cylinder 11 basically in an entire operation range by compression ignition (i.e., controlled auto ignition (CAI)). The engine 1 includes an ignition assist system 56 for assisting ignition of the air-fuel mixture under a predetermined environment. The ignition assist system 56 may be, e.g., a discharge plug disposed to face the interior of the combustion chamber 17. Specifically, a pulse high voltage controlled is applied to an electrode of the discharge plug such that an ultra-short pulsed electrical discharge is generated, thereby generating a streamer discharge inside the combustion chamber 17 and generating ozone inside the cylinder. The ozone assists CAI. The ignition assist system is not limited to the discharge plug generating ozone, and may be a spark plug imparting energy to the air-fuel mixture by spark discharge to assist CAI.

The engine controller 100 is a controller including a known microcomputer as a basis. The engine controller 100 includes a central processing unit (CPU) that executes programs, a memory configured, for example, as a RAM and a ROM and storing programs and data, and an input and output (I/O) bus inputting and outputting electrical signals.

The engine controller 100 receives at least a signal indicating the flow rate of intake air from an air flow sensor 51, a crank angle pulse signal from a crank angle sensor 52, an accelerator position signal from an accelerator position sensor 53 which detects the degree of depression of the accelerator pedal, and a vehicle speed signal from a vehicle speed sensor 54. Based on these input signals, the engine controller 100 calculates parameters for controlling the engine 1, such as a desired throttle position signal, a fuel injection pulse, an ignition assisting signal, and a valve phase angle signal. Then, the engine controller 100 outputs these signals to, e.g., the throttle valve 55 (more accurately, a throttle actuator which operates the throttle valve 55), VTTs 23, 24, the fuel supply system 57, and the ignition assist system 56.

As described above, the geometric compression ratio c of this engine 1 is set to equal to or higher than 15. The geometric compression ratio may suitably be less than or equal to 40, and is preferably equal to or higher than 20 and equal to or lower than 35. The engine 1 has a configuration such that the higher compression ratio is, the higher the expansion ratio is. Thus, the engine 1 has a high compression ratio and a relatively high expansion ratio at the same time. The high geometric compression ratio stabilizes CAI combustion.

The combustion chamber 17 is defined by the inner peripheral surface of the cylinder 11, the top surface 160 of the piston 16, the lower surface (i.e., the ceiling portion 170) of the cylinder head 13, and the valve head surfaces of the intake valve 21 and the exhaust valve 22. Heat shield layers are provided at the above-mentioned defining surfaces to reduce the cooling loss. With these layers, the combustion chamber 17 is heat-shielded. The heat shield layers may be provided on all or part of the defining surfaces. Moreover, the heat shield layer may also be provided on the wall surfaces of the intake ports 18 and the exhaust ports 19 near the openings at the ceiling portion 170 of the combustion chamber 17, although such wall surfaces are not the wall surfaces directly defining the combustion chamber 17.

These heat shield layers are designed to have lower thermal conductivity than the base metal material forming the combustion chamber 17 to reduce the dissipation of the heat of the combustion gas in the combustion chamber 17 through the defining surfaces.

The heat shield layers preferably have lower volumetric specific heat than the base material to reduce the cooling loss. Specifically, it is preferable to decrease the thermal capacity of the heat shield layers to allow the temperature of the defining surfaces of the combustion chamber 17 varies in accordance with a change in the gas temperature in the combustion chamber 17.

The heat shield layers may be formed by coating the base material with a ceramic material, such as $ZrO_2$, by plasma spray coating. The ceramic material may contain a large number of pores. This allows for further reducing the thermal conductivity and volumetric specific heat of the heat shield layers.

In this embodiment, in addition to the above-described heat shield structure of the combustion chamber 17, a heat-insulating layer (i.e., a gas layer) formed inside the combustion chamber 17 significantly reduces the cooling loss.

Specifically, fuel is injected through the injection tip of the fuel injection valve 6 into the cavity 163 during and after the compression stroke such that a gas layer including fresh air is formed in an outer peripheral portion of the combustion chamber 17 and an air-fuel mixture layer is formed in a central portion of the combustion chamber 17. By this, as illustrated in FIG. 2, the air-fuel mixture layer is formed in the central portion of the cavity 163 near the fuel injection valve 6, and a heat-insulating gas layer containing fresh air is formed to surround the air-fuel mixture layer. The air-fuel mixture layer as used herein may be a layer comprised of a combustible air-fuel mixture. The combustible air-fuel mixture may be defined, for example, as an air-fuel mixture with an equivalence ratio $\varphi$ of higher than or equal to 0.1. The fuel spray spreads with time after the start of the fuel injection. The size of the air-fuel mixture layer used herein is the size at the time of ignition. The ignition is considered as ignition when, for example, a fuel combustion mass ratio turns to 1% or more. The air-fuel mixture is ignited at a timing when the piston is close to the compression top dead center.

The heat-insulating gas layer may contain only fresh air, or may contain burnt gas (i.e., EGR gas) in addition to the fresh air. A small amount of fuel can be mixed into the heat-insulating gas layer without causing any problems. In order to function as a heat-insulating layer, the heat-insulating gas layer merely needs to be fuel-leaner than the air-fuel mixture layer.

If the air-fuel mixture is burned by CAI combustion with the heat-insulating gas layer and the air-fuel mixture layer formed as described above, the heat-insulating gas layer between the air-fuel mixture layer and the wall surface of the cylinder 11 reduces the risk of the flames of the air-fuel mixture layer reaching the wall surface of the cylinder 11. The heat-insulating gas layer serves as a heat-insulating layer, and hence reduces the risk of heat being dissipated from the wall surfaces of the cylinder 11. As a result, the cooling loss can be reduced significantly.

Merely reducing the cooling loss does not greatly contribute to enhancement in the indicated thermal efficiency, since the reduced cooling loss is converted to the exhaust loss. However, due to an increase in the expansion ratio accompanying an increase in the compression ratio, the engine 1 efficiently converts the energy of the combustion gas corresponding to the reduced cooling loss into mechanical work. That is, the engine 1 significantly enhances the thermal efficiency indicated by employing a structure which reduces both the cooling loss and the exhaust loss.

To form such an air-fuel mixture layer and such a heat-insulating gas layer in the combustion chamber 17, the gas flow intensity in the combustion chamber 17 is beneficially low when the fuel is injected. Thus, the intake ports have a straight shape which prevents a vortex from forming, or makes it difficult for a vortex to form, in the combustion chamber 17, and is designed to minimize the intensity of a tumble flow.

(Detail of Fuel Injection Control)

The timing at which fuel is injected into the combustion chamber 17 in order to form the air-fuel mixture layer and the heat-insulating gas layer in the combustion chamber 17 is preferably a second half of the compression stroke. The "second half of the compression stroke" is defined as the latter half of a compression stroke period divided into two equal periods. In the second half of the compression stroke, the pressure and temperature in the cylinder 11 are increased. This allows for reducing the risk of the fuel spray reaching the wall surface of the combustion chamber 17 due to too long fuel spray. In addition, a time from the end of the fuel injection to the start of the combustion is relatively shortened. This makes it difficult to mix the air-fuel mixture layer and the heat-insulating gas layer, which are formed in the combustion chamber 17, with each other, thereby allowing for securing the heat-insulating gas layer at the combustion.

The time taken to change the crank angle is long when the engine 1 is operated at a low rotational speed. Thus, even if the fuel injection end timing is close to the compression top dead center because of the fuel injection in the second half of the compression stroke, it is possible to have a time for fuel vaporization and air and fuel mixing before the start of ignition. However, an increase in the rotational speed of the engine 1 decreases the time taken to change the crank angle. If the fuel injection end timing comes close to the compression top dead center, the time after the injection end and before ignition is shortened. As a result, the fuel cannot be vapored sufficiently, and air and fuel cannot be mixed sufficiently. This may cause generation of smoke.

On the other hand, if the fuel injection start timing is intended to be advanced to advance the fuel injection end timing, the fuel is injected into the cylinder 11 with the cylinder 11 having the low pressure and temperature. In this case, fuel spray tends to reach the wall surface of the combustion chamber 17.

The engine 1 injects the fuel in a specially designed manner so as to reliably form a heat-insulating gas layer around an air-fuel mixture layer while reducing generation of smoke even if the engine 1 is operated at a rotational speed which falls within a high rotational speed. Specifically, FIG. 4 illustrates a fuel injection manner in a low load range where the amount of fuel injected is relatively small. In FIG. 4, the horizontal axis represents the crank angle, and the vertical axis represents the lift amount of the fuel injection valve 6. The upper figure of FIG. 4 shows a fuel injection manner where the engine 1 is operated at a rotational speed which falls within a low rotational speed range. In the low rotational speed range, fuel is injected with a predetermined lift amount for a predetermined injection period. A waveform indicating a change of the lift amount relative to the crank angle has a trapezoidal shape. The fuel injection is set to start at a predetermined timing in a terminal period of the compression stroke. The terminal period of the compression stroke is defined as the terminal period of a compression stroke period divided into three periods, namely, initial, interim, and terminal periods. In the low rotational speed range, as described above, even if the fuel injection end timing comes close to the compression top dead center, it is possible to have a time for fuel vaporization and air-fuel mixing. Therefore, the fuel injection in the low rotational speed range is set to start at a relatively retarded timing.

FIG. 6 conceptually illustrates the spread of the fuel spray that has been injected into the combustion chamber 17 in the fuel injection manner shown in the upper figure of FIG. 4. As described above, since the fuel injection is set to start at a relatively retarded timing, the pressure and temperature in the cylinder 11 are relatively high. This reduces too long fuel spray injected from the fuel injection valve 6 at a predetermined spray angle. As a result, this reduces the risk of the fuel spray reaching the wall surface of the combustion chamber 17. This allows for forming the heat-insulating gas layer around the air-fuel mixture layer.

The lower figure of FIG. 4 shows a fuel injection manner where the engine 1 is operated at a rotational speed which falls within a high rotational speed range where the rotational speed is higher than that in the above low rotational speed range. Note that the fuel injection amount in the upper figure of FIG. 4 is the same as that in the lower figure of FIG. 4. The lift amount of the fuel injection valve 6 and the fuel injection period in the low rotational speed range may be the same as, or different from, that in the high rotational speed range. In the high rotational speed range, unlike the low rotational speed range, the fuel is injected in a lift amount changing mode where the lift amount of the fuel injection valve 6 is changed in the midway of the fuel injection period. The fuel injection is set to start at a predetermined timing in a terminal period of the compression stroke. The fuel injection start timing is advanced in the high rotational speed range with respect to the low rotational speed range. That is because, in consideration of fuel vaporization and fuel-air mixing, in the high rotational speed range, the fuel injection end timing is as far as possible from the timing of reaching the compression top dead center.

FIG. 5 shows, in the lift amount changing mode, a change in a lift amount in the fuel injection valve 6 (the upper figure of FIG. 5), and a change in the injection speed of the fuel (the lower figure of FIG. 5). As illustrated also in FIG. 3, the larger the lift amount in the outwardly-opening fuel injection valve 6 is, the larger the effective opening area of the injection port 61 is. At the start of the fuel injection, reducing the effect of the resistance by increasing the effective opening area allows the injection speed of the fuel to increase quickly. If the fuel injection is started with a relatively large lift amount as indicated by the solid line in the upper figure of FIG. 5 (see times $T_0$-$T_1$), the injection speed of the fuel increases quickly as indicated by the solid line in the lower figure of FIG. 5. In the lift amount changing mode, the lift amount is set to be large in an earlier period of the injection period. Note that "the earlier period of the injection period"

means a relatively earlier part of the injection period, and is not limited to the former half of the injection period divided into two equal periods.

In contrast to the lift amount changing mode where the lift amount is large at the start of the injection, if the lift amount is decreased as indicated by the broken line in the upper figure of FIG. 5, the fuel injection speed increases slowly as indicated by the broken line in the lower figure of FIG. 5.

After the injection speed of the fuel is sufficiently increased, in the lift amount changing mode, the fuel is continuously injected while the lift amount is changed to a small lift amount which is smaller than the large lift amount, as indicated by the solid line in the upper figure of FIG. 5. This small lift amount can be set as appropriate so as to be a lift amount associated with the fastest fuel injection speed or a lift amount larger than such a lift amount.

The decrease in the lift amount decreases the effective opening area of the injection port 61. The effective opening area is decreased with the injection speed of the fuel sufficiently increased. As a result, the flow of the fuel is such that the injection speed of the fuel passing through the injection port 61 increases without a decrease in the flow rate of the injection due to the inertial dynamic effect (see times $T_2$-$T_3$). The decrease in the lift amount allows the fuel in the injection port 61 to be pushed out. Thus, the injection speed rises quickly.

In the later period of the injection period, the lift amount of the fuel injection valve 6 is continuously set to the small lift amount. This allows the injection speed of the fuel is kept relatively high (see times $T_3$-$T_5$). In this way, the valve is closed (see times $T_5$-$T_6$). The time for changing the lift amount may be a suitable timing such that a sufficient amount of the fuel is injected even after the injection speed of the fuel is sufficiently increased as stated above, and the lift amount is changed. That is to say, "the later period of the injection period" means a relatively later part of the injection period, and is not limited to the latter half of the injection period divided into two equal periods. The injection duration of the fuel (injections times $T_0$-$T_6$) in the lift amount changing mode is approximately 0.2 msec.

The broken lines in the upper and lower figures of FIG. 5 indicate an example where the lift amount of the fuel injection valve 6 in the earlier period of the injection period is as small as that in the later period of the injection period. In this case, the lift amount at the start of the fuel injection is small, and thus, the injection speed of the fuel increases slowly (see times $T_0$-$T_5$).

If the lift amount of the fuel injection valve 6 is continuously set to the large lift amount in the later period of the injection period as indicated by the one-dot-chain line in the upper figure of FIG. 5, the injection speed of the fuel is not increased and is constant with a predetermined speed as indicated by the one-dot-chain line in the lower figure of FIG. 5 (see times $T_2$-$T_4$).

In the lift amount changing mode, the injection speed of the fuel can be increased in the later period of the injection period. As a result, in the later period of the injection period, the fuel spray is injected at a high speed into the cylinder 11 which is close to the compression top dead center and has an increased pressure and temperature. The fuel spray is blown in the combustion chamber 17 while receiving a large resistance. This facilitates atomizing the fuel. As a result, the fuel is vaporized in a short period of time, and the fuel and the air are quickly mixed with each other to form an air-fuel mixture. In this way, even if the engine 1 is in the high rotational speed range and the time from the end of the fuel injection to ignition is shortened, the fuel can be vaporized and the fuel and the air can be mixed with each other in such a short period of time. This reduces generation of smoke.

FIG. 7 conceptually illustrates the spread of the fuel spray that has been sprayed into the combustion chamber 17 in the fuel injection manner shown in the lower figure of FIG. 4. The fuel injection in the high rotational speed range is set to start at a timing earlier than that in the low rotational speed range. Thus, the pressure and temperature in the cylinder 11 are relatively low at the start of the fuel injection. The fuel spray reaches a location far from the fuel injection valve 6. This improves the air utilization rate in the combustion chamber 17. The fuel injection start timing is set to be advanced as much as possible as long as the fuel spray does not reach the wall surface of the combustion chamber 17.

In the high rotational speed range, the fuel injection is ended earlier than in the low rotational speed range. In addition, as described above, in the high rotational speed range, the fuel is injected in the lift amount changing mode, which is disadvantageous for dispersion, since the fuel that has been injected in the later period of the injection period is located adjacent to the center of the combustion chamber 17. However, this facilitates the fuel vaporization and the air-fuel mixing due to the high injection speed (see an enclosed part by the one-dot-chain line in FIG. 7). As a result, in the high rotational speed range, it is possible to form the heat-insulating gas layer around the air-fuel mixture layer while reducing generation of smoke.

In a situation where the engine 1 is operated with a load which falls within a low load range, and a relatively small amount of the fuel is injected, even if the fuel is collectively injected, the air-fuel mixture layer can be made small as shown in FIG. 4. As a result, the heat-insulating gas layer can be formed around the air-fuel mixture layer. In contrast, in a situation where the load of the engine 1 is increased to increase the fuel injection amount, the collective injection of the fuel makes it difficult to make the air-fuel mixture layer small, resulting in difficulty in forming a heat-insulating gas layer around the air-fuel mixture layer.

In this regard, performing split fuel injection, i.e., fuel injection into the combustion chamber 17 several times, not performing collective fuel injection, is advantageous in forming the heat-insulating gas layer around the air-fuel mixture layer while improving the air utilization rate in the combustion chamber 17. However, the fuel injection is split into several injections, thereby allowing the fuel sprays to overlap with each other. This may locally form an excessively concentrated, air-fuel mixture and may generate smoke.

A split injection in which injection is performed several times is provided with an idle period between one injection and a subsequent injection. When the engine 1 is operated in the low rotational speed range where the rotational speed is relatively low, the time taken to change the crank angle is prolonged. As a result, even if the fuel injection start timing is not advanced or the fuel injection end timing is not retarded, the idle period between one injection and a subsequent injection is prolonged relatively. As a result, the fuel spray subsequently injected is less likely to be affected by the air flow due to the fuel spray that has been injected earlier, and it is possible to reduce the risk of the subsequently injected fuel spray being attracted to and overlapping with the earlier injected fuel spray.

By contrast, when the engine 1 is operated in the high rotational speed range, the time taken to change the crank angle is shortened. Therefore, even if the crank angle between one injection and a subsequent injection is the same as that in the low rotational speed range, the idle period between the injection and the subsequent injection is made shorter. In the case, the subsequently injected fuel spray tends to be affected by the air flow due to the earlier injected fuel spray, and be attracted to and overlap with the earlier injected fuel spray. As a result, the air-fuel mixture locally becomes excessively concentrated, thereby causing generation of smoke.

The engine 1, in a middle load range with a load higher than the load in the low load range, injects the fuel in a specially designed manner regardless of the rotational speed of the engine 1 such that the air-fuel mixture is not locally concentrated excessively.

Specifically, FIG. 8 shows a fuel injection manner in the middle load range. In FIG. 8, the horizontal axis represents the crank angle, and the vertical axis represents the lift amount of the fuel injection valve 6. Note that the fuel injection amount in the upper figure of FIG. 8 is the same as that in the lower figure of FIG. 8. The upper figure of FIG. 8 shows a fuel injection manner where the engine 1 is operated at a rotational speed which falls within the low rotational speed range. In the low rotational speed range, a first injection is performed, and then, a second injection is performed. The first injection is performed with a relatively large, first lift amount. The injection period in the first injection is a relatively short, first injection period. In the low rotational speed range with the middle load, the first injection is a first-stage injection, and a second injection is a second-stage injection.

FIG. 9 shows a change in the lift amount of the fuel injection valve 6 (the upper figure of FIG. 9) and a change in the fuel injection speed (the lower figure of FIG. 9). As indicated by the solid line in the upper figure of FIG. 9, if the lift amount is relatively large, the effective opening area becomes relatively large. Thus, the influence of the resistance due to the wall surface of the injection port 61 is reduced to make it possible to quickly increase the fuel injection speed. As a result, as indicated by the solid line in the lower figure of FIG. 9, even in a short injection period, the fuel injection speed can increase quickly to reach a predetermined injection speed, and such a speed can be kept. The first injection in FIG. 8 is associated with the fuel injection in which the lift amount is high and the injection period is short.

In the low rotational speed range, the fuel injection start timing (crank angle) of the first injection is set to a predetermined timing. Specifically, this timing may be the second half of the compression stroke. Because of the low rotational speed of the engine 1, the long idle period can be secured between the first and second injections even if the fuel injection start timing is not advanced.

In the first injection, the fuel injection speed increases quickly due to the high lift amount, as described above. FIG. 10 conceptually illustrates the spread of the fuel spray that has been sprayed into the combustion chamber 17. This spread of the fuel spray is associated with the fuel injection manner shown in the upper figure of FIG. 8 with the middle load in the low rotational speed range. The fuel spray injected in the first injection from the fuel injection valve 6 with a predetermined spray angle, resisting the high pressure and temperature in the cylinder 11, reaches a location far from the fuel injection valve 6. This improves the air utilization rate in the combustion chamber 17. The fuel injection is set to start in the second half of the compression stroke, and thus, the pressure and temperature in the cylinder 11 is high at the start of the injection. Therefore, this reduces too long fuel spray and reduces the risk of the fuel spray reaching the wall surface of the combustion chamber 17. This allows for forming the heat-insulating gas layer around the air-fuel mixture layer.

After the end of the first injection and a predetermined interval, the second injection is performed. In the second injection, the fuel is injected with a second lift amount smaller than the first lift amount in the first injection for a second injection period shorter than the first injection period in the first injection.

As indicated by the broken lines in the upper and lower figures of FIG. 9, the lift amount is relatively low to allow the fuel injection speed to increase slowly. However, the injection period is prolonged, thereby gradually increasing the injection speed. As a result, the injection speed finally reaches a high value. For example, the one-dot-chain lines in the upper and lower figures of FIG. 9 indicate a change in the fuel injection speed when the lift amount is relatively large and the injection period is set to be long. In the earlier period of the injection period, if the lift amount is high, the injection speed is high, whereas in the later period of the injection period, if the lift amount is low, the injection speed is high.

The fuel spray injected in the second injection initially has a low spray speed after the start of injection. This reduces, in addition to a long idle period between the first and second injections, the risk of the fuel spray injected in the second injection reaching and overlapping with the fuel spray injected in the first injection. Also, the long idle period reduces the risk of the fuel spray injected in the second injection being attracted to the air flow by the first injection. As a result, the fuel spray injected in the first injection and the fuel spray injected in the second injection are shifted from each other in the injection direction.

Also, the injection period is longer in the second injection. Thus, as shown in FIG. 10, the fuel spray injected in the second injection becomes close to the injection axis S of the fuel injection valve 6. That is to say, the spray flow formed in the combustion chamber 17 along with the fuel injection involves the surrounding air. However, the air hardly enters the inside of the fuel spray injected in the form of a hollow cone from the tip portion of the fuel injection valve 6. Therefore, the longer the injection period is, the stronger the negative pressure around the injection axis S of the fuel injection valve 6 is. As a result, the fuel spray comes close to the injection axis S of the fuel injection valve 6, as indicated by the solid line arrow in FIG. 10, due to the pressure difference between the inside and outside of the fuel spray. As a result, the fuel spray injected in the first injection and the fuel spray injected in the second injection are also shifted from each other in the angle direction of the spray angle. More specifically, assuming that the axis of the fuel spray injected in the first injection is a reference and a direction perpendicular to the axis is a radial direction, the fuel spray injected in the second injection is located radially inwardly from the fuel spray injected in the first injection. In this way, the overlap of the fuel sprays are reduced. This reliably can reduce the risk of the air-fuel mixture layer being locally concentrated excessively. As a result, this reduces generation of smoke.

As shown in the lower figure of FIG. 8, when the engine 1 is operated with the middle load in the high rotational speed range, the second injection is earlier performed. The second injection is associated with the first-stage injection. Subsequently, the first injection is performed as the second-stage injection. The first injection in the high rotational speed range is a fuel injection in the above-described lift amount changing mode. Note that the fuel injection amount in the upper figure of FIG. 8 is the same as that in the lower figure of FIG. 8.

When the rotational speed of the engine 1 is high, the idle period between one injection and a subsequent injection is shortened. Like the low rotational speed range, if the first injection where the fuel injection speed is higher is earlier performed, the air flow involved in the fuel spray becomes strong, whereas in the second injection performed subsequently, the fuel injection speed is initially lower after the start of injection, and thus, the fuel spray is attracted to the strong air flow and tends to overlap with the fuel spray injected in the first injection.

Also, if the fuel injection start timing (crank angle at the start of injection) is advanced such that the idle period between one injection and a subsequent injection is prolonged, the pressure and temperature in the cylinder 11 are decreased at the start of the fuel injection. In this state, if the first injection where the lift amount is relatively large and the injection period is relatively long is earlier performed, the fuel spray is sprayed too long due to a high injection speed, and the fuel spray reaches the wall surface of the combustion chamber 17.

Therefore, the engine 1 performs the second injection earlier in the high rotational speed range. Also, the injection start timing of the second injection (i.e., the crank angle) is advanced with respect to the injection start timing of the first injection in the low rotational speed range (see the upper and lower figures of FIG. 8). The second injection may be set to start in the second half of the compression stroke. FIG. 11 illustrates the spread of the fuel spray that has been sprayed into the combustion chamber 17. This spread of the fuel spray is associated with the fuel injection manner shown in the lower figure of FIG. 8 in the low rotational speed range. In the second injection, the injection speed is initially slow after the start of injection, and thus, this reduces too long fuel spray even if the fuel injection starts in a situation where the pressure and temperature in the cylinder 11 are not so high. The risk of the fuel spray reaching the wall surface of the combustion chamber 17 is reduced, thereby making it possible to form the heat-insulating gas layer around the air-fuel mixture layer. Also, the injection start timing of the second injection is advanced, thereby allowing the idle period between the second and first injections to be as long as possible.

The injection period is long in the second injection, and as described above, the fuel spray comes close to the injection axis S of the fuel injection valve 6 due to the pressure difference between the inside and outside of the fuel spray (see FIG. 11).

After the end of the second injection and a predetermined interval, the first injection is performed in the lift amount changing mode. This first injection (i.e., the second-stage injection) is performed in the terminal period of the compression stroke. In the first injection, the lift amount at the start of injection, i.e., the lift amount in the earlier period of the injection period, is set to be the first lift amount (i.e., corresponding to the large lift amount). This quickly increases the injection speed after the start of injection. Also, the idle period between the second and first injections are prolonged as much as possible. As a result, the fuel spray injected in the first injection is less likely to be affected by the air flow by the second injection. That is to say, the risk of the fuel spray injected in the first injection being attracted to the air flow is reduced. Also, as described above, the fuel spray injected in the second injection comes close to the injection axis S of the fuel injection valve 6 due to the pressure difference, whereas in the first injection, the fuel spray is injected with a predetermined spray angle to be shifted from the fuel spray injected in the second injection in the angle direction of the spray angle. In this way, even in the high rotational speed range, the risk of the fuel spray injected in the first injection overlapping with the fuel spray injected in the second injection is reduced, thereby reducing the risk of locally forming the excessively concentrated air-fuel mixture.

The first injection (i.e., the second-stage injection) in the high rotational speed range is performed in the lift amount changing mode, and thus, in the later period of the injection period, the lift amount of the fuel injection valve 6 is set to be smaller than the first lift amount (i.e., the small lift amount) while the fuel injection is maintained. The lift amount in the later period of the injection period may be set to a suitable lift amount that is in a range equal to or greater than the lift amount associated with the fastest speed. As a result, as described above, atomization of the fuel spray injected in the later period of the injection period is facilitated. The atomized fuel is vaporized within a short period of time, and the fuel and the air are quickly mixed with each other to form an air-fuel mixture. As a result, this may reduce generation of smoke. The second-stage injection in the high rotational speed range is performed in the lift amount changing mode. This can retard the fuel injection end timing in the second-stage injection as much as possible. This is advantageous in prolonging the idle period between the first-stage and second-stage injections in the high rotational speed range where the time taken to change the crank angle is decreased. In other words, this can reduce the risk of locally forming an excessively concentrated air-fuel mixture to reduce generation of smoke. Also, this is also advantageous in retarding the injection start timing in the first-stage injection as much as possible. That is to say, it is possible to reliably form the air-fuel mixture layer and the gas layer around the air-fuel mixture layer in the combustion chamber 17.

In this way, performing the first and second injections allows for forming the air-fuel mixture layer and the gas layer around the air-fuel mixture layer in the combustion chamber 17 while reducing the risk of locally forming an excessively concentrated air-fuel mixture and generation of smoke in a situation where the engine 1 is operated with the middle load at the rotational speed which falls within the low rotational speed range, and in a situation where the engine 1 is operated with the middle load at the rotational speed which falls within the high rotational speed range.

FIG. 12 shows another fuel injection manner different from that in FIG. 8. The fuel injection manner with the middle load at the rotational speed which falls within the low rotational speed range differs between FIG. 12 and FIG. 8. In other words, as shown in the upper figure of FIG. 12, the second injection with the middle load at the low rotational speed range is configured as a multi-stage injection including plural injections. As described above, the fuel injection valve 6 including the piezoelectric element is highly responsive, and is capable of multi-stage injection, e.g., about twenty-time injections in a period of 1-2 msec. The lift amount in the second injection configured as a multi-stage injection is the second lift amount as well as in the injection manner shown in FIG. 8. The injection period in the second injection configured as a multi-stage injection is longer than that in the first injection, just like the injection manner shown in FIG. 8. If the second injection is performed by a multi-stage injection, the fuel spray injected comes close to the fuel injection valve 6, and the injection axis S of the fuel injection valve 6, as shown in FIG. 10. As a result, the fuel spray injected in the first injection and the fuel spray injected in the second injection can be shifted from each other in the injection direction and in the radial direction perpendicular to the injection direction.

In the example of FIG. 12, the injections constituting the second injection are performed substantially without intervals. However, a predetermined interval may be provided between a fuel injection and a subsequent fuel injection. In the high rotational speed range, the time taken to change the crank angle is shortened, it becomes difficult to perform the multi-stage injection.

In the above example, the injection manner shown in FIG. 4 is adopted in the low load range, and the injection manner shown in FIG. 8 or FIG. 12 is adopted in the middle load range. However, the injection manner shown in FIG. 4 may also be adopted in the middle load range, and conversely, the injection manner shown in FIG. 8 or FIG. 12 may also be adopted in the low load range. If the load of the engine 1 is increased to be higher than the load in the middle load range, the fuel injection amount is further increased, thereby making it difficult to form the heat-insulating gas layer around the air-fuel mixture layer. Therefore, if the load of the engine 1 is in the high load range, an injection manner different from the above manners may be adopted.

In the above example, an outwardly-opening fuel injection valve is adopted as the fuel injection valve 6. However, the fuel injection valve 6 applicable to the technique disclosed herein is not limited to this outwardly-opening fuel injection valve. For example, a valve covered orifice (VCO) nozzle type injector can change the effective opening area of the injection port by adjusting the degree of the cavitation generated in the nozzle. Accordingly, as well as the outwardly-opening fuel injection valve, the fuel injection manner shown in FIG. 4, FIG. 8 or FIG. 12 allows for forming an air-fuel mixture layer in the center of the cavity 163 and a heat-insulating gas layer around the air-fuel mixture layer and for reducing the risk of locally forming a excessively concentrated air-fuel mixture.

In the above example, the heat shield structure is adopted in the combustion chamber and the intake ports, and the heat-insulating gas layer is formed in the combustion chamber. However, the technique disclosed herein is applicable to an engine where such a heat shield structure is not adopted.

DESCRIPTION OF REFERENCE CHARACTERS

1 Engine (Engine Body)
100 Engine Controller (Fuel Injection Controller)
11 Cylinder
12 Cylinder Block
13 Cylinder Head
16 Piston
17 Combustion Chamber
6 Fuel Injection Valve
61 Injection Port
62 Outwardly-Opening Valve

The invention claimed is:

1. A fuel injection control device for a direct-injection engine, the fuel injection control device comprising:
    an engine body having a combustion chamber defined by a ceiling portion of a cylinder head, a cylinder provided to a cylinder block, and a piston reciprocating in the cylinder; and
    a fuel injection controller having a fuel injection valve disposed so as to inject liquid fuel into the combustion chamber, and configured to inject the fuel into the combustion chamber at a predetermined timing, wherein
    the fuel injection valve is configured such that an effective opening area of an injection port through which the fuel is injected increases as a lift amount of the fuel injection valve increases, and
    the fuel injection controller
        injects the fuel in a lift amount changing mode in which, when the fuel is injected into the combustion chamber in a terminal period of a compression stroke, the lift amount of the fuel injection valve is set to a predetermined large lift amount in an earlier period of an injection period, and in a later period of the injection period following the earlier period of the injection period, the lift amount is set to a small lift amount smaller than the large lift amount and is in a range where a fuel injection speed increases, and
        performs, when the engine body is operated at a rotational speed which falls within a predetermined high rotational speed range, a second-stage injection in which the fuel is injected in the lift amount changing mode, and before the second-stage injection, a first-stage injection in which the fuel is injected with a lift amount smaller than the large lift amount for an injection period longer than and spaced apart from the second-stage injection.

* * * * *